United States Patent
Kubota et al.

(10) Patent No.: US 10,627,604 B2
(45) Date of Patent: Apr. 21, 2020

(54) IMAGING LENS

(71) Applicant: KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 56 days.

(21) Appl. No.: 15/968,816

(22) Filed: May 2, 2018

(65) Prior Publication Data

US 2018/0364456 A1 Dec. 20, 2018

(30) Foreign Application Priority Data

Jun. 15, 2017 (JP) .................. 2017-117816

(51) Int. Cl.
*G02B 9/60* (2006.01)
*G02B 13/00* (2006.01)
*G02B 13/04* (2006.01)

(52) U.S. Cl.
CPC ........... *G02B 13/0045* (2013.01); *G02B 9/60* (2013.01); *G02B 13/04* (2013.01)

(58) Field of Classification Search
CPC ... G02B 9/60; G02B 9/62; G02B 9/64; G02B 13/0045; G02B 13/008
USPC ......... 359/708–714, 754–756, 762, 763, 770
See application file for complete search history.

(56) References Cited

U.S. PATENT DOCUMENTS

| | | | | |
|---|---|---|---|---|
| 8,654,457 | B2* | 2/2014 | Jin | G02B 9/60 |
| | | | | 359/763 |
| 9,036,277 | B2* | 5/2015 | Kubota | G02B 13/04 |
| | | | | 359/714 |
| 2014/0104702 | A1 | 4/2014 | Yamakawa et al. | |
| 2015/0212299 | A1 | 7/2015 | Yamakawa et al. | |
| 2017/0131519 | A1* | 5/2017 | Hsieh | G02B 9/60 |
| 2018/0059367 | A1* | 3/2018 | Lai | G02B 13/18 |
| 2019/0086637 | A1 | 3/2019 | Yamazaki et al. | |

FOREIGN PATENT DOCUMENTS

JP 2016-029501 A 3/2016

* cited by examiner

*Primary Examiner* — Darryl J Collins
(74) *Attorney, Agent, or Firm* — Kubotera & Associates, LLC

(57) ABSTRACT

An imaging lens includes a first lens group and a second lens group, arranged in this order from an object side to an image plane side. The first lens group includes a first lens having negative refractive power, a second lens having negative refractive power, and a third lens. The second lens group includes a fourth lens and a fifth lens having negative refractive power. The first lens is formed in a shape so that a curvature radius of a surface thereof on the image plane side is positive. The fifth lens is formed in a shape so that a surface thereof on the image plane side is aspheric.

18 Claims, 21 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a smartphone and a cellular phone, a digital camera, an infrared camera, a digital video camera, an onboard camera, a network camera, a TV conference camera, a fiberscope, and a capsule endoscope.

Some vehicles are equipped with a plurality of cameras for improving safety and/or convenience. For example, as a camera to support the driver to safely back a vehicle, there is a backup camera. Since the rear view from a driver's seat is poor, even if the driver is extra careful, the vehicle may hit an obstacle during backing, which may result in an accident. In case of a vehicle equipped with a backup camera, the view behind the vehicle is displayed on a monitor upon backing the vehicle. Since the driver can visually check an object(s) behind the vehicle even when the object is hard to see due to shadow behind the vehicle, the driver can safely back the vehicle without hitting an obstacle. Such camera for mounting in a vehicle, so-called "onboard camera", is expected to be continuously more demanded.

Such onboard cameras may be mounted in relatively small spaces, such as a back door, a front grille, side mirror, and interior space thereof. For this reason, an imaging lens for mounting in an onboard camera is required to have a compact size. Further, the imaging lens for an onboard camera is required to attain high resolution suitable for high pixel count of an imaging element and a wide angle of view to take a wider range of an image. However, when downsizing of an imaging lens is attempted, refractive power of each lens becomes strong, so that it is difficult to satisfactorily correct aberrations. Therefore, it is difficult to attain a wider angle of view, in addition to satisfying the requirements such as small size and high resolution, while satisfactorily correcting aberrations. Upon actual designing of an imaging lens, it is a key to meet those requirements in a balanced manner.

On the other hand, in place of cellular phones that are intended mainly for making phone calls, so-called "smartphones", i.e., multifunctional cellular phones which can run various application software as well as a voice call function, have been more widely used. The product lineup of smartphones is very wide including beginner models to high-end models, and is often categorized by performance of hardware, optical performance of a camera, etc. Among those high-end models, there is a model that is intended to have a new added value by equipping two imaging lenses. For example, in case of a conventional model having an imaging lens having a wide angle of view as well as an imaging lens of typical angle of view, images from those two imaging lenses are synthesized being processed by software, so as to achieve smooth zooming in and zooming out. Similarly to the imaging lense of the onboard camera, the imaging lens used for such purpose is required to have even smaller size, as well as high resolution and wider angle of view.

For example, as such conventional imaging lens having a wide angle of view, an imaging lens described in Patent Reference has been known.

Patent Reference: Japanese Patent Application Publication No. 2016-29501

According to the Patent Reference, the conventional imaging lens includes a first lens, a second lens, a third lens, a fourth lens, and a fifth lens, arranged in the order from the object side. The first lens is negative and has a meniscus shape directing a convex surface thereof to an object side. The second lens is negative, the third lens is positive, the fourth lens is positive, and the fifth lens is negative. According to the conventional imaging lens, it is achievable to attain small size and a wide angle of view of the imaging lens, by satisfying a plurality of conditional expressions for distances on an optical axis between lens surfaces, a conditional expression for a distance from an object-side surface of the first lens to an image plane and a focal length of the whole lens system, a conditional expression for a focal length of the third lens and a focal length of the whole lens system, a plurality of conditional expressions for curvature radii of the fourth lens and the fifth lens, a conditional expression for a back focal length and a focal length of the whole lens system, etc.

In these years, there are more diverse demands for an imaging lens of a wide angle of view. Especially in these years, there is higher demands for cameras that enable users to take images of objects even in the dark. Therefore, even in case of an imaging lens for mounting in a camera, it is necessary to ensure the imaging lens to have satisfactory optical performance in the dark. In order to take an image of an object in the dark, for example, it is necessary to irradiate near-infrared light to the object from the camera and take picture of the reflected light. However, the wavelengths of near-infrared light beams are longer than those of visible light beams. Therefore, in case of typical wide-angle lenses, a focal position of a near-infrared light significantly shifts relative to that of a visible light and it is difficult to form an image of the object on an imaging element. Therefore, in case of an imaging lens of this type, it is necessary to have an image-forming performance in the range of near-infrared light as well as the range of a visible light.

According to the conventional imaging lens of Patent Reference, although the number of lenses that composes the conventional imaging lens is as small as five, the imaging angle of view is wide, and aberrations are relatively satisfactorily corrected. However, in case of conventional imaging lens having wide angles, such as the one described in Patent Reference, it is difficult to obtain satisfactorily image-forming performance over wide wavelength range from that of visible light to that of near-infrared light. As one of solutions for such problem, an optical element may be inserted/removed between an imaging lens and an imaging element so as to adjust a focal length. However, to do so, the imaging lens or the camera has to include a mechanism for inserting/removing the optical element, which is not preferred in view of downsizing of the imaging lens and/or the camera.

Here, such problem is not unique to the imaging lens for mounting in an onboard camera and smartphones. In case of security cameras, it becomes a "must-have" function to be able to take an image by infrared radiation so as to monitor after sunset. In case of digital cameras and digital video cameras, there are already products available in the market, which are equipped with a night vision function. In addition, in case of network cameras, TV conference cameras, and cameras of fiberscopes and capsule endoscopes, there are products available, which have a function of taking images in a near-infrared range. The above-described problems are common among imaging lenses for mounting in relatively small-sized cameras of this type.

In view of the above-described problems in the conventional techniques, an object of the present invention is to provide an imaging lens that can attain a wider angle of view and satisfactory correct aberrations, while achieving a small size.

Further objects and advantages of the present invention will be apparent from the following description of the invention.

SUMMARY OF THE INVENTION

In order to attain the objects described above, according to a first aspect of the present invention, an imaging lens includes a first lens group and a second lens group, arranged in the order from an object side to an image plane side. The first lens group includes a first lens having negative refractive power, a second lens having negative refractive power, and a third lens. The second lens group includes a fourth lens, and a fifth lens having negative refractive power. According to the imaging lens of the invention, the first lens is preferably formed in a shape so as to have a positive curvature radius on an image plane-side surface thereof. The fifth lens is formed so as to have an aspheric surface on an image plane-side surface thereof. According to the imaging lens of the invention having the above-described configuration, when the whole lens system has a focal length f, the first lens has a focal length f1, the second lens has a focal length f2, a distance along an optical axis between the first lens and the second lens is D12, the first lens has an Abbe's number vd1, and the second lens has an Abbe's number vd2, the imaging lens of the invention satisfies the following conditional expressions (1) through (5):

$$0.03 < f1/f2 < 0.3 \quad (1)$$

$$-45 < f2/f < -5 \quad (2)$$

$$0.1 < D12/f < 0.8 \quad (3)$$

$$40 < vd1 \quad (4)$$

$$40 < vd2 \quad (5)$$

The imaging lens of the invention includes the first lens group and the second lens group, arranged in the order from the object side to the image plane side. The first lens group includes a first lens having negative refractive power, a second lens having negative refractive power; and a third lens. The second lens group includes the fourth lens and the fifth lens having negative refractive power. Among them, the first lens is formed so as to have a positive curvature radius on the image plane-side surface thereof. The third lens is formed so as to have a negative curvature radius on the object-side surface thereof. Moreover, the fifth lens has an aspheric surface on an image plane-side surface thereof.

According to a second aspect of the invention, in the imaging lens having the above-described configuration, when the whole lens system has the focal length f, the first lens has the focal length f1, the second lens has the focal length f2, and a distance along the optical axis between the second lens and the third lens is D23, the imaging lens of the invention satisfies the following conditional expressions (1) and (6):

$$0.03 < f1/f2 < 0.3 \quad (1)$$

$$0.3 < D23/f < 3.0 \quad (6)$$

According to the second aspect of the invention, in the imaging lens having such configuration, it is suitably achievable to have a wider angle of view by the first lens having negative refractive power and the second lens having negative refractive power. In case of a conventional typical imaging lens, when a wider angle of view is achieved by increasing the refractive power of the first lens, a concave surface on the image plane side of the first lens will have a shape close to a hemispherical shape. When the shape of a lens surface is close to a hemispherical shape, it is more difficult to uniformly apply coating on the surface such as antireflective coating, which may result in quality loss and/or increase in manufacturing cost of the imaging lens. In this regard, according to the imaging lens of the invention, the wider angle is achieved with two negative lenses, the first lens and the second lens. Therefore, the shape of the concave surface on the image plane-side surface of the first lens is far from a hemispherical shape. Therefore, it is achievable to suitably have a wide angle of view of the imaging lens, while securing easiness of manufacturing the imaging lens.

As shown in the conditional expression (1), according to the configuration of the imaging lens of the invention, the second lens has weaker refractive power than that of the first lens. The second lens serves as an aberration correction lens to correct aberrations generated in the first lens. When the imaging lens satisfies the conditional expression (1), it is achievable to satisfactorily correct astigmatism, a chromatic aberration, and a distortion. When the value exceeds the upper limit of "0.3", it is advantageous for correction of the distortion. However, a chromatic aberration of magnification is insufficiently corrected (an image-forming point at a short wavelength moves in a direction to be closer to the optical axis relative to that at a reference wavelength). In addition, an astigmatic difference increases. Therefore, it is difficult to obtain satisfactory image-forming performance. On the other hand, when the value is below the lower limit of "0.03", it is advantageous for correction of the chromatic aberration. However, since the distortion increases, it is difficult to obtain satisfactory image-forming performance.

When the imaging lens satisfies the conditional expression (2), it is achievable to satisfactorily correct a chromatic aberration, the field curvature, astigmatism, and a coma aberration respectively, while downsizing the imaging lens. When the value exceeds the upper limit of "−5", the back focal length is long, and it is difficult to downsize the imaging lens. In addition, the image-forming surface curves to the image plane side and the astigmatic difference increases, so that it is difficult to obtain satisfactory image-forming performance. On the other hand, when the value is below the lower limit of "−45", it is advantageous for downsizing of the imaging lens. However, an inner coma aberration is easily generated for off-axis light fluxes. In addition, the image-forming surface curves to the object side and the astigmatic difference increases, so that it is difficult to obtain satisfactory image-forming performance.

When the imaging lens satisfies the conditional expression (3), it is achievable to satisfactorily correct the field curvature, the astigmatism, the chromatic aberration, and the distortion, respectively. When the value exceeds the upper limit of "0.8", the astigmatic difference increases, so that it is difficult to obtain satisfactory image-forming performance. On the other hand, when the value is below the lower limit of "0.1", negative distortion increases. Moreover, the image-forming surface curves to the image plane side and the chromatic aberration of magnification is insufficiently corrected. Therefore, it is difficult to obtain satisfactory image-forming performance.

When the imaging lens satisfies the conditional expressions (4) and (5), it is achievable to satisfactorily correct an axial chromatic aberration and the chromatic aberration of magnification. When the imaging lens is made of a low-dispersion material(s) that satisfies the conditional expressions (4) and (5), it is suitably restrain the chromatic aberration generated in the first and the second lenses. As a result, it is achievable to obtain satisfactory image-forming performance over wider wavelength range from visible light to near-infrared light.

When the imaging lens satisfies the conditional expression (6), it is achievable to satisfactorily correct the chromatic aberration, the field curvature, and the astigmatism, respectively. When the value exceeds the upper limit of "3.0", the axial chromatic aberration is excessively corrected (a focal position at a short wavelength moves to the image plane side relative to that at a reference wavelength), and the chromatic aberration of magnification is insufficiently corrected. In addition, the image-forming surface curves to the image plane side and the astigmatic difference increases, so that it is difficult to obtain satisfactory image-forming performance. On the other hand, when the value is below the lower limit of "0.3", it is advantageous for correction of the chromatic aberration, but the image-forming surface curves to the object side, and the astigmatic difference increases. Therefore, it is difficult to obtain satisfactory image-forming performance.

Moreover, according to the imaging lens of the invention, the fifth lens has an image plane-side surface that is formed in an aspheric shape. For an imaging element of a CCD sensor, CMOS sensor, or the like, there is a chief ray angle (CRA) that is set in advance as a range of an incident angle of a light beam that can be taken in the image plane. In case of an imaging lens of a wide angle, which has a large imaging angle of view, the incident angle easily tends to be large around the image plane. In this regard, in case of imaging lens of the invention, the fifth lens has the image plane-side surface that is formed as an aspheric shape. Therefore, the incident angle of the light beam emitted from the fifth lens is suitably restrained within the CRA range from the center part of the image plane of the imaging element to the peripheral area.

According to the imaging lens having the above-described configuration, the third lens is preferably formed in a shape so as to have negative curvature radius on the object-side surface thereof. With such shape of the third lens, it is achievable to suitably correct the field curvature.

In the imaging lens having the above-described configuration, the second lens preferably has weaker refractive power than that of the first lens, the third lens, the fourth lens, and the fifth lens, respectively. In general, when two lenses having negative refractive powers are arranged in the order from the object side, and the refractive power of the lens arranged on the image plane side is made stronger than that of the other, while keeping the focal length of the whole lens system constant, the position of a principal point for the whole lens system moves in a direction to be away from the second lens (the position of that moves in a direction to be closer to the image plane), and the back focal length gets long. Such lens configuration is disadvantageous for downsizing of the imaging lens. Accordingly, by making the refractive power of the second lens weakest in the whole lens system, it is achievable to suitably attain downsizing of the imaging lens, while attaining wide angle of the imaging angle of view and correction of distortion in a balanced manner.

According to a third aspect of the invention, in order to more satisfactorily correct the chromatic aberration, the imaging lens having the above-described configuration preferably satisfies the following conditional expression (7):

$$40<vd3 \qquad (7)$$

According to a fourth aspect of the invention, when the third lens has a focal length f3, the imaging lens having the above-described configuration preferably satisfies the following conditional expression (8):

$$-15<f2/f3<-1.5 \qquad (8)$$

When the imaging lens satisfies the conditional expression (8), it is achievable to satisfactorily correct the chromatic aberration and the astigmatism, while downsizing of the imaging lens. When the value exceeds the upper limit of "−1.5", the axial chromatic aberration is excessively corrected, and the chromatic aberration of magnification is insufficiently corrected. Moreover, in the astigmatism, a tangential image surface curves to the image plane side and the astigmatic difference increases. For this reason, it is difficult to obtain satisfactory image-forming performance. On the other hand, when the value is below the lower limit of "−15", it is advantageous for downsizing of the imaging lens. However, in the astigmatism, the tangential image surface curves to the object side and the astigmatic difference increases. Therefore, it is difficult to obtain satisfactory image-forming performance.

According to a fifth aspect of the invention, when a composite focal length of the first lens and the second lens is f12 and the third lens has a focal length f3, the imaging lens having the above-described configuration preferably satisfies the following conditional expression (9):

$$-2<f12/f3<-0.1 \qquad (9)$$

When the imaging satisfies the conditional expression (9), it is achievable to satisfactorily correct the chromatic aberration, the astigmatism, and the distortion, respectively.

When the value exceeds the upper limit of "−0.1", the axial chromatic aberration is excessively corrected, and the chromatic aberration of magnification is excessively corrected (an image-forming point at a short wavelength moves in a direction to be away from the optical axis relative to that at a reference wavelength). Moreover, the negative distortion increases, so that it is difficult to obtain satisfactory image-forming performance. On the other hand, when the value is below the lower limit of "−2", it is easy to correct the distortion. However, the astigmatic difference increases, so that it is difficult to obtain satisfactory image-forming performance.

According to a sixth aspect of the invention, when a thickness of the second lens on the optical axis is T2, the imaging lens preferably satisfies the following conditional expression (10):

$$0.05<T2/f<0.5 \qquad (10)$$

When the imaging lens satisfies the conditional expression (10), it is possible to satisfactorily correct the field curvature, the astigmatism, and the distortion, respectively, while downsizing the imaging lens. When the value exceeds the upper limit of "0.5", it is difficult to downsize the imaging lens. Moreover, the image-forming surface curves to the object side and the astigmatic difference increases. Therefore, it is difficult to obtain satisfactory image-forming performance. On the other hand, when the value is below the lower limit of "0.05", it is advantageous for downsizing of the imaging lens. However, the negative distortion increases, so that it is difficult to obtain satisfactory image-forming performance.

According to a seventh aspect of the invention, the imaging lens having the above-described configuration preferably further satisfies the following conditional expression (10A):

$$0.05 < T2/f < 0.2 \tag{10A}$$

According to an eighth aspect of the invention, when a thickness of the third lens on the optical axis is T3, the imaging lens preferably satisfies the following conditional expression (11):

$$0.3 < T3/f < 2.0 \tag{11}$$

When the imaging lens satisfies the conditional expression (11), it is achievable to satisfactorily correct the chromatic aberration, the field curvature, the astigmatism, and the distortion, respectively, while downsizing the imaging lens. When the value exceeds the upper limit of "2.0", it is difficult to downsize the imaging lens, and the chromatic aberration of magnification is insufficiently corrected. In addition, the image-forming surface curves to the image plane side and the astigmatic difference increases. Moreover, the negative distortion increases. Therefore, it is difficult to obtain satisfactory image-forming performance. On the other hand, when the value is below the lower limit of "0.3", it is advantageous for downsizing of the imaging lens. However, the image-forming surface curves to the object side and the astigmatic difference increases. Therefore, also in this case, it is difficult to obtain satisfactory image-forming performance.

According to a ninth aspect of the invention, the fourth lens has positive refractive power and the imaging lens having the above-described configuration preferably satisfies the following conditional expressions (12) and (13):

$$40 < vd4 \tag{12}$$

$$15 < vd5 < 30 \tag{13}$$

According to the imaging lens having the configuration, the fourth lens having positive refractive power is made of a low-dispersion material, and the fifth lens having negative refractive power is made of a high-dispersion material. With such combination of the refractive powers and the dispersions, the fourth lens and the fifth lens primarily work as a lens group to correct the chromatic aberration, and thereby the axial chromatic aberration and chromatic aberration of magnification are both satisfactorily corrected.

According to a tenth aspect of the invention, when the fourth lens has a focal length f4, the imaging lens having the above-described configuration preferably satisfies the following conditional expression (14):

$$0.5 < f4/f < 2.5 \tag{14}$$

When the imaging lens satisfies the conditional expression (14), it is achievable to satisfactorily correct the chromatic aberration, the coma aberration, and the distortion, respectively, while restraining the incident angle of a light beam emitted from the imaging lens to an image plane within the range of CRA. When the value exceeds the upper limit of "2.5", an outer coma aberration is easily generated for off-axis light fluxes. Therefore, it is difficult to obtain satisfactory image-forming performance. Moreover, it is difficult to restrain the incident angle of a light beam emitted from the imaging lens within the range of CRA. On the other hand, when the value is below the lower limit of "0.5", it is easy to restrain the incident angle of a light beam emitted from the imaging lens within the range of CRA. However, the negative distortion increases. Moreover, since the inner coma aberration is easily generated for off-axis light fluxes, it is difficult to obtain satisfactory image-forming performance.

According to an eleventh aspect of the invention, when the fourth lens has a focal length f4 and the fifth lens has a focal length f5, the imaging lens having the above-described configuration preferably satisfies the following conditional expression (15):

$$-2 < f4/f5 < -0.2 \tag{15}$$

When the imaging lens satisfies the conditional expression (15), it is achievable to satisfactorily correct the chromatic aberration, the field curvature, the astigmatism, the coma aberration, and the distortion in a balanced manner. When the value exceeds the upper limit of "−0.2", it is difficult to correct the chromatic aberration. In addition, the image-forming surface curves to the image plane side, and the astigmatic difference increases. As a result, it is difficult to obtain satisfactory image-forming performance. On the other hand, when the value is below the lower limit of "−2", it is advantageous to correct the chromatic aberration. However, the tangential image surface curves to the object side and the astigmatic difference increases. Moreover, the outer coma aberration increases, so that it is difficult to obtain satisfactory image-forming performance.

According to a twelfth aspect of the invention, when the whole lens system has a focal length fd at a d line, and a focal length fir at the wavelength of 850 nm, the imaging lens having the above-described configuration preferably satisfies the following conditional expression (16):

$$0.9 < fir/fd < 1.1 \tag{16}$$

When the imaging lens satisfies the conditional expression (16), it is achievable to obtain satisfactory image-forming performance in a wide wavelength range. When the value is outside the range of the conditional expression (16), the difference between the focal position for a visible light beam and that for a near-infrared light beam is significant. Therefore, even though the image-forming performance is satisfactory upon imaging under visible light, the image-forming performance may be deteriorated upon imaging under near-infrared light. Therefore, it is difficult to obtain satisfactory image-forming performance over a wide wavelength range.

According to a thirteenth aspect of the invention, when the whole lens system has the focal length f and a distance along the optical axis from an object-side surface of the first lens to an image plane is La, the imaging lens having the above-described configuration preferably satisfies the following conditional expression (17):

$$2 < La/f < 10 \tag{17}$$

In these years, there is an increasing demand for taking images of a wider range through an imaging lens. In this case, the imaging lens is often required to have both a small size and a wide angle. Especially in case of an imaging lens to be built in a thin portable device, e.g. smartphone, it is necessary to be able to accommodate an imaging lens in a limited space. Therefore, there is often a strict limitation in a length of the imaging lens in a direction of an optical axis. According to the imaging lens of the invention, when the imaging lens satisfies the conditional expression (17), it is achievable to attain downsizing and a wider angle of view of the imaging lens in a balanced manner. Here, between the imaging lens and the image plane of the imaging element, there is often disposed an insert such as an infrared cut-off filter and a cover glass. In this specification, air conversion length is used for a distance of such insert on the optical axis.

An imaging element with high pixel count is more frequently combined with an imaging lens for a purpose of improving performance of a camera. In case of such imaging element with a high pixel count, a light-receiving area of each pixel decreases, so that an image tends to be dark. As a method of correcting the darkness of the image, there is a method of improving light-receiving sensitivity of the imaging element by using an electrical circuit. However, when the light-receiving sensitivity increases, a noise component, which does not directly contribute to formation of an image, is also amplified. Therefore, it is necessary to have another circuit to reduce the noise. Accordingly, in order to obtain fully bright image without such electrical circuit, according to a fourteenth aspect of the invention, when the whole lens system has the focal length f and the imaging lens has a diameter of entrance pupil Dep, the imaging lens having the above-described configuration preferably satisfies the following conditional expression (18):

$$f/\text{Dep} < 2.5 \tag{18}$$

According to a fifteenth aspect of the invention, when the third lens has the focal length f3 and the fourth lens has the focal length f4, the imaging lens having the above-described configuration preferably satisfies the following conditional expression (19):

$$1.5 < f3/f4 < 20 \tag{19}$$

When the imaging lens satisfies the conditional expression (19), it is achievable to satisfactorily correct the chromatic aberration, the field curvature, and the astigmatism, respectively, while downsizing the imaging lens. When the value exceeds the upper limit of "20", it is advantageous for downsizing of the imaging lens. However, since the imaging-forming surface curves to the object side and the astigmatic difference increases, it is difficult to obtain satisfactory image-forming performance. On the other hand, when the value is below the lower limit of "1.5", the axial chromatic aberration and the chromatic aberration of magnification are both excessively corrected. Moreover, the image-forming surface curves to the image plane side and the astigmatic difference increases. Therefore, it is difficult to obtain satisfactory image-forming performance.

According to the imaging lens having the above-described configuration, the second lens is preferably formed in a shape so that the curvature radii of an object-side surface and an image plane-side surface are both positive, i.e. so as to be formed in a shape of a meniscus lens directing a convex surface thereof to the object side near the optical axis.

According to a sixteenth aspect of the invention, when a curvature radius of the image plane-side surface of the second lens is R2r and a curvature radius of the object-side surface of the third lens is R3f, the imaging lens having the above-described configuration preferably satisfies the following conditional expression (20):

$$-2 < R2r/R3f < -0.2 \tag{20}$$

When the imaging lens satisfies the conditional expression (20), it is achievable to satisfactorily correct the astigmatism, the field curvature, and the distortion, respectively. When the value exceeds the upper limit of "−0.2", the image-forming surface curves to the object side and the astigmatic difference increases. Therefore, it is difficult to obtain satisfactory image-forming performance. On the other hand, when the value is below the lower limit of "−2", the astigmatic difference increases, and the negative distortion increases. For this reason, it is difficult to obtain satisfactory image-forming performance.

According to the imaging lens having the above-described configuration, it is preferred to have a stop between the first lens group and the second lens group, i.e., between the third lens and the fourth lens. With the stop disposed in the above-described position, it is achievable to suitably restrain an incident angle of a light beam emitted from the imaging lens to the image plane within the range of CRA, and suitably restrain the aberrations such as the chromatic aberration of magnification and the distortion. When the stop is disposed at a position closer to the image plane side relative to the above-described position, it is advantageous for correction of the chromatic aberration of magnification. However, it is difficult to restrain the incident angle of a light beam emitted from the imaging lens within the range of CRA. Furthermore, since the size of the first lens increases, it is difficult to downsize the imaging lens. On the other hand, when the stop is disposed at a position closer to the object side relative to the above-described position, it is difficult to correct the chromatic aberration of magnification and the distortion of off-axis light beams, and it is difficult to obtain satisfactory image-forming performance.

When the imaging lens of the invention has an angle of view $2\omega$, the imaging lens preferably satisfies $120° \leq 2\omega$. When the imaging lens satisfies the conditional expression, the imaging lens can have a wider angle of view, and it is suitably achievable to attain both downsizing and a wider angle of view of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface is a convex surface. "An object-side surface having a negative curvature radius" means the object side surface is a concave surface. In addition, "an image plane-side surface having a positive curvature radius" means the image plane-side surface is a concave surface. "An image plane-side surface having a negative curvature radius" means the image plane-side surface is a convex surface. Here, a curvature radius used herein refers to a paraxial curvature radius and may not fit to general shapes of the lenses in their sectional views all the time.

According to the imaging lens of the invention, it is achievable to provide an imaging lens having a wide angle of view, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

According to the embodiment of the invention, the imaging lens includes a first lens group, an aperture stop, and a second lens group. The first lens group is composed of a first lens, a second lens and a third lens. The second lens group is composed of a fourth lens and a fifth lens.

Figure 1:
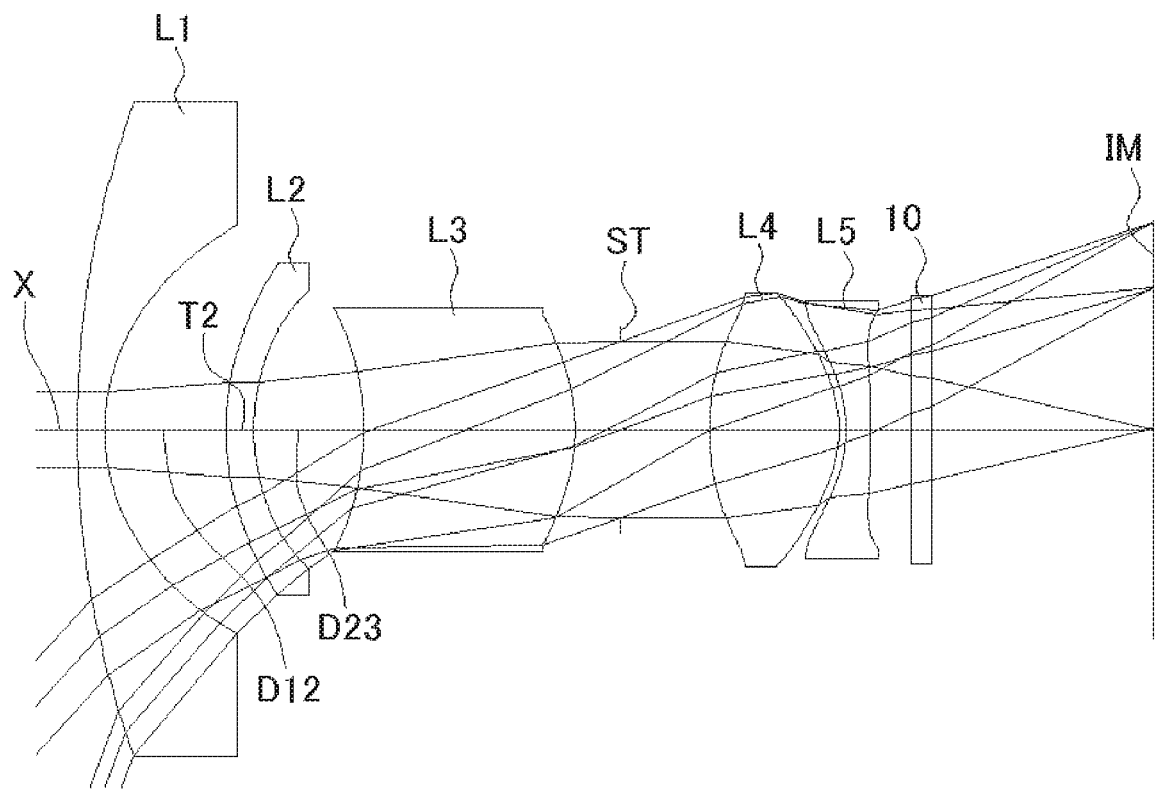
FIG. 1 shows a sectional view of a schematic configuration of an imaging lens in Numerical Data Example 1 of the present invention.

More specifically, as shown in FIG. 1, the first lens group includes a first lens L1 having negative refractive power, a second lens L2 having negative refractive power, and a third lens L3 having positive refractive power, arranged in the order from an object side to an image plane side. The second lens group includes a fourth lens L4 having positive refractive power, and a fifth lens L5 having negative refractive power, arranged in the order from an object side to an image plane side. Between the third lens L3 of the first lens group and the fourth lens L4 of the second lens group, there is disposed the aperture stop ST. Between the fifth lens L5 and an image plane IM of an imaging element, there is provided a filter 10. The filter 10 is omissible.

The first lens L1 is formed in a shape such that a curvature radius r1 of a surface thereof on the object-side and a curvature radius r2 of a surface thereof on the image plane side are both positive, so as to have a shape of a meniscus lens directing a convex surface thereof to the object side near an optical axis X. The shape of the first lens L1 may not be limited to the one in Numerical Data Example 1. The first lens L1 can be formed in any shape, as long as the curvature radius r2 of a surface thereof on the image plane side is positive. Numerical Data Examples 6 and 7 are examples, in which the first lens L1 is formed in a shape, such that the curvature radius r1 of a surface thereof on the object side is negative, i.e., so as to have a shape of a biconcave lens near the optical axis X.

The second lens L2 is formed in a shape such that a curvature radius r3 of an object-side surface thereof and a curvature radius r4 of an image plane-side surface thereof are both positive, so as to have a shape of a meniscus lens directing a convex surface thereof to the object side near the optical axis X.

The third lens L3 is formed in a shape such that a curvature radius r5 of an object-side surface thereof and a curvature radius r6 of an image plane-side surface thereof are both negative, so as to have a shape of a meniscus lens directing a concave surface thereof to the object side near the optical axis X. The shape of the third lens L3 is not limited to the one in Numerical Data Example 1. The third lens L3 can be formed in any shape, as long as the curvature radius r6 of a surface thereof on the image plane side is negative. Numerical Data Examples 6 and 7 are examples, in which the third lens L3 is formed in a shape, such that the curvature radius r5 of a surface thereof on the object side is positive, i.e., so as to have a shape of a biconvex lens near the optical axis X.

The fourth lens L4 is formed in a shape such that a curvature radius r8 of a surface thereof on the object side is positive and a curvature radius r9 of a surface thereof on the image plane side is negative, so as to have a shape of a biconvex lens near the optical axis X. The shape of the fourth lens L4 is not limited to the one in Numerical Data Example 1. The fourth lens L4 can be formed in any shape, as long as the curvature radius r9 of a surface thereof on the image plane side is negative. Numerical Data Examples 6 and 7 are examples, in which the fourth lens L4 is formed in a shape, such that the curvature radius r8 of the object-side surface thereof is negative, i.e., so as to have a shape of a meniscus lens directing a concave surface thereof to the object side near the optical axis X.

The fifth lens L5 is formed in a shape such that a curvature radius r10 of an object-side surface thereof and a curvature radius r11 of an image plane-side surface thereof are both negative, so as to have a shape of a meniscus lens directing a concave surface thereof to the object side near the optical axis X. The shape of the fifth lens L5 is not limited to the one in Numerical Data Example 1. The fifth lens L5 can be formed in any shape, as long as the curvature radius r10 of the object-side surface thereof is negative. Numerical Data Examples 6 and 7 are examples, in which the fifth lens L5 is formed in a shape, such that a curvature radius r11 of an image plane-side surface thereof is positive, i.e., so as to have a shape of a biconcave lens near the optical axis X.

According to the embodiment, the imaging lens satisfies the following conditional expressions (1) to (18):

$$0.03 < f1/f2 < 0.3 \quad (1)$$

$$-45 < f2/f < -5 \quad (2)$$

$$0.1 < D12/f < 0.8 \quad (3)$$

$$40 < vd1 \quad (4)$$

$$40 < vd2 \quad (5)$$

$$0.3 < D23/f < 3.0 \quad (6)$$

$$40 < vd3 \quad (7)$$

$$-15 < f2/f3 < -1.5 \quad (8)$$

$$-2 < f12/f3 < -0.1 \quad (9)$$

$$0.05 < T2/f < 0.5 \quad (10)$$

$$0.05 < T2/f < 0.2 \quad (10A)$$

$$0.3 < T3/f < 2.0 \quad (11)$$

$$40 < vd4 \quad (12)$$

$$15 < vd5 < 30 \quad (13)$$

$$0.5 < f4/f < 2.5 \quad (14)$$

$$-2 < f4/f5 < -0.2 \quad (15)$$

$$0.9 < fir/fd < 1.1 \quad (16)$$

$$2 < La/f < 10 \quad (17)$$

$$f/Dep < 2.5 \quad (18)$$

In the above conditional expressions:
f: Focal length of the whole lens system
fd: Focal length of the whole lens system at a d line
fir: Focal length of the whole lens system at a wavelength of 850 nm
f1: Focal length of the first lens L1
f2: Focal length of the second lens L2
f3: Focal length of the third lens L3
f4: Focal length of the fourth lens L4
f5: Focal length of the fifth lens L5.
f12: Composite focal length of the first lens L1 and the second lens L2
T2: Thickness of the second lens L2 on the optical axis X
T3: Thickness of the third lens L3 on the optical axis X
D12: Distance along the optical axis X between the first lens L1 and the second lens L2
D23: Distance along the optical axis X between the second lens L2 and the third lens L3

La: Distance on the optical axis X from the object-side surface of the first lens L1 to the image plane IM (air conversion length for the filter 10)
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
Dep: Diameter of entrance pupil Furthermore, Numerical Data Examples 1 through 5 also satisfy the following conditional expressions (19) and (20):

$$1.5 < f3/f4 < 20 \quad (19)$$

$$-2 < R2r/R3f < -0.2 \quad (20)$$

In the above conditional expressions:
R2r: Curvature radius of an image plane-side surface of the second lens L2 (=r4)
R3f: Curvature radius of an object-side surface of a third lens L3 (=r5)

Here, it is not necessary to satisfy all of the conditional expressions, and it is achievable to obtain an effect corresponding to the respective conditional expression when any single one of the conditional expressions is individually satisfied.

According to the embodiment, lens surfaces of each of the first lens L1 to the fifth lens L5 are formed as aspheric shapes. The aspheric shapes of the lens surfaces are expressed by the following formula:

$$Z = \frac{C \cdot H^2}{1 + \sqrt{1 - (1+k) \cdot C^2 \cdot H^2}} + \Sigma(An \cdot H^n) \quad \text{[Formula 1]}$$

In the above conditional expression:
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index at a d line, nir represents a refractive index at a wavelength of 850 nm, and vd represents an Abbe's number, respectively. Here, aspheric surfaces are indicated with surface numbers i affixed with * (asterisk).

NUMERICAL DATA EXAMPLE 1

Basic Lens Data

TABLE 1

| f = 2.43 mm Fno = 2.2 ω = 70.0° | | | | | | |
|---|---|---|---|---|---|---|
| i | r | d | nd | nir | vd | [mm] |
|  | ∞ | ∞ |  |  |  |  |
| L1 | 1* 14.060 | 0.400 | 1.5348 | 1.5274 | 55.7 | f1 = −6.968 |
|  | 2* 2.917 | 1.749 | (=D12) |  |  |  |

TABLE 1-continued

| | | f = 2.43 mm Fno = 2.2 ω = 70.0° | | | | | |
|---|---|---|---|---|---|---|---|
| | i | r | d | nd | nir | vd | [mm] |
| L2 | 3* | 3.934 | 0.400 | 1.5348 | 1.5274 | 55.7 | f2 = −42.109 |
| | 4* | 3.230 | 1.588 (=D23) | | | | |
| L3 | 5* | −3.869 | 3.046 | 1.5348 | 1.5274 | 55.7 | f3 = 9.429 |
| | 6* | −2.790 | 0.657 | | | | |
| ST | 7 | ∞ | 1.286 | | | | |
| L4 | 8* | 4.109 | 1.865 | 1.5348 | 1.5274 | 55.7 | f4 = 2.670 |
| | 9* | −1.842 | 0.099 | | | | |
| L5 | 10* | −2.181 | 0.361 | 1.6503 | 1.6291 | 21.5 | f5 = −3.909 |
| | 11* | −16.332 | 0.577 | | | | |
| | 12 | ∞ | 0.300 | 1.5168 | | 64.2 | |
| | 13 | ∞ | 3.189 | | | | |
| (IM) | | ∞ | | | | | |

$T2$=0.400 mm
$T3$=3.064 mm
fd=2.429 mm
fir=2.437 mm
f12=−5.581 mm
La=15.415 mm
Dep=1.106 mm

TABLE 2

| | | | | Aspherical surface data | | | | |
|---|---|---|---|---|---|---|---|---|
| i | k | A4 | A6 | A8 | A10 | A12 | A14 | A16 |
| 1 | −6.077E−02 | 0.000E+00 | 0.000E+00 | 0.000E+00 | 0.000E+00 | 0.000E+00 | 0.000E+00 | 0.000E+00 |
| 2 | −3.416E−01 | 0.000E+00 | 0.000E+00 | 0.000E+00 | 0.000E+00 | 0.000E+00 | 0.000E+00 | 0.000E+00 |
| 3 | −8.349E−01 | 0.000E+00 | 0.000E+00 | 0.000E+00 | 0.000E+00 | 0.000E+00 | 0.000E+00 | 0.000E+00 |
| 4 | 7.373E−01 | 0.000E+00 | 0.000E+00 | 0.000E+00 | 0.000E+00 | 0.000E+00 | 0.000E+00 | 0.000E+00 |
| 5 | 0.000E+00 | −6.169E−04 | −2.988E−04 | 1.362E−04 | −8.131E−06 | 0.000E+00 | 0.000E+00 | 0.000E+00 |
| 6 | 3.644E−01 | 1.125E−02 | 2.431E−03 | −7.189E−04 | 1.287E−04 | 0.000E+00 | 0.000E+00 | 0.000E+00 |
| 8 | 0.000E+00 | 1.125E−02 | 7.094E−03 | −6.340E−03 | 1.909E−03 | −1.614E−04 | −6.317E−05 | 1.131E−05 |
| 9 | −6.152E+00 | −8.394E−02 | 6.450E−02 | −3.376E−02 | 1.074E−02 | −1.900E−03 | 1.481E−04 | −1.685E−06 |
| 10 | 0.000E+00 | −2.815E−02 | 4.025E−02 | −1.022E−02 | −8.004E−04 | 1.492E−03 | −3.757E−04 | 3.218E−05 |
| 11 | 0.000E+00 | −3.249E−02 | 3.221E−02 | −8.012E−03 | 9.924E−04 | 1.974E−05 | 4.342E−05 | −1.200E−05 |

The values of the respective conditional expressions are as follows:

$f1/f2$=0.165

$f2/f$=−17.335

$D12/f$=0.720

$D23/f$=0.654

$f2/f3$=−4.466

$f12/f3$=−0.592

$T2/f$=0.165

$T3/f$=1.254

$f4/f$=1.099

$f4/f5$=−0.683

$fir/fd$=1.003

$La/f$=6.346

$f/Dep$=2.2

$f3/f4$=3.532

$R2r/R3f$=−0.835

Accordingly, the imaging lens of Numerical Data Example 1 satisfies the above-described conditional expressions.

Figure 2:
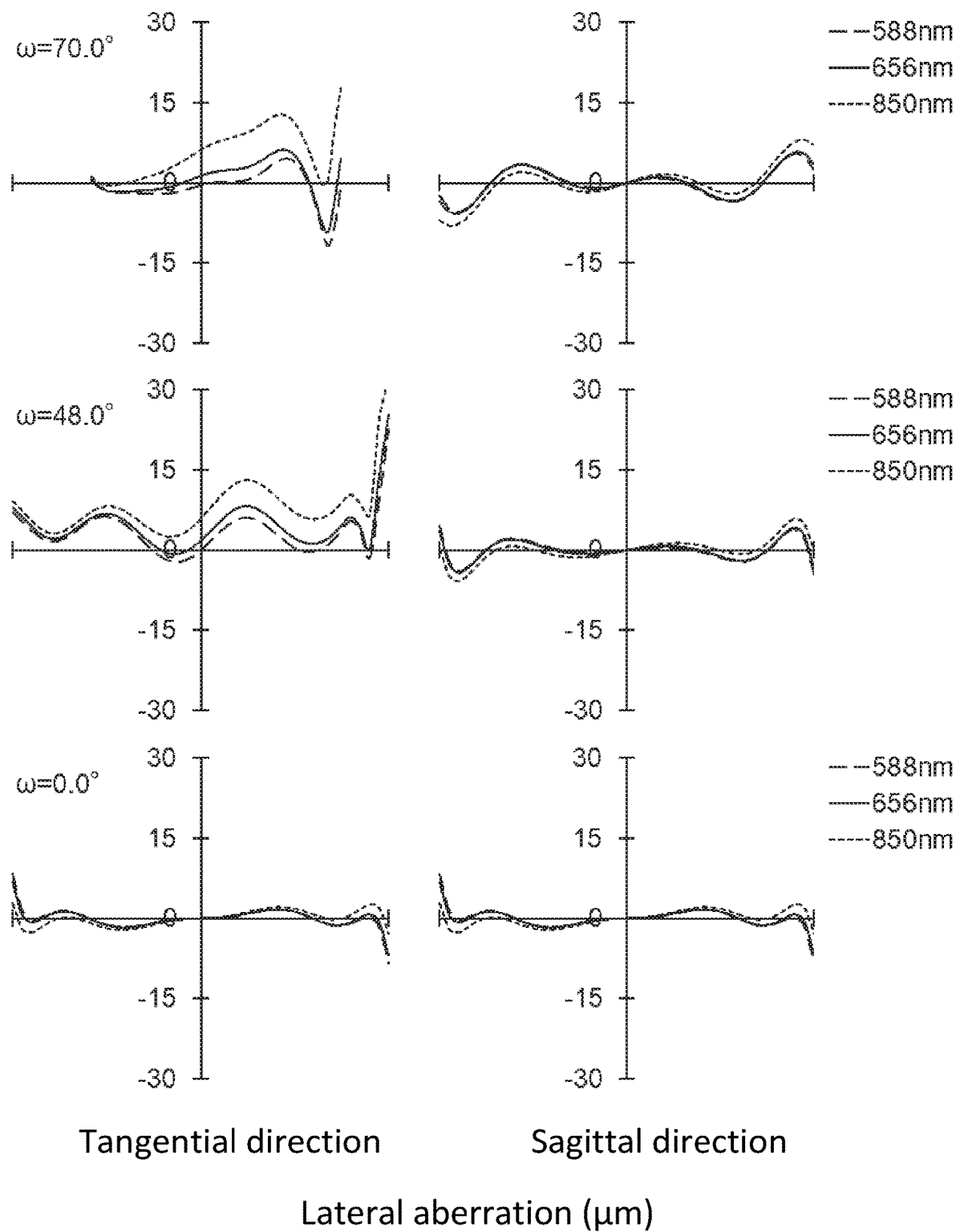
FIG. 2 is an aberration diagram showing a lateral aberration of the imaging lens of FIG. 1.
Figure 3:
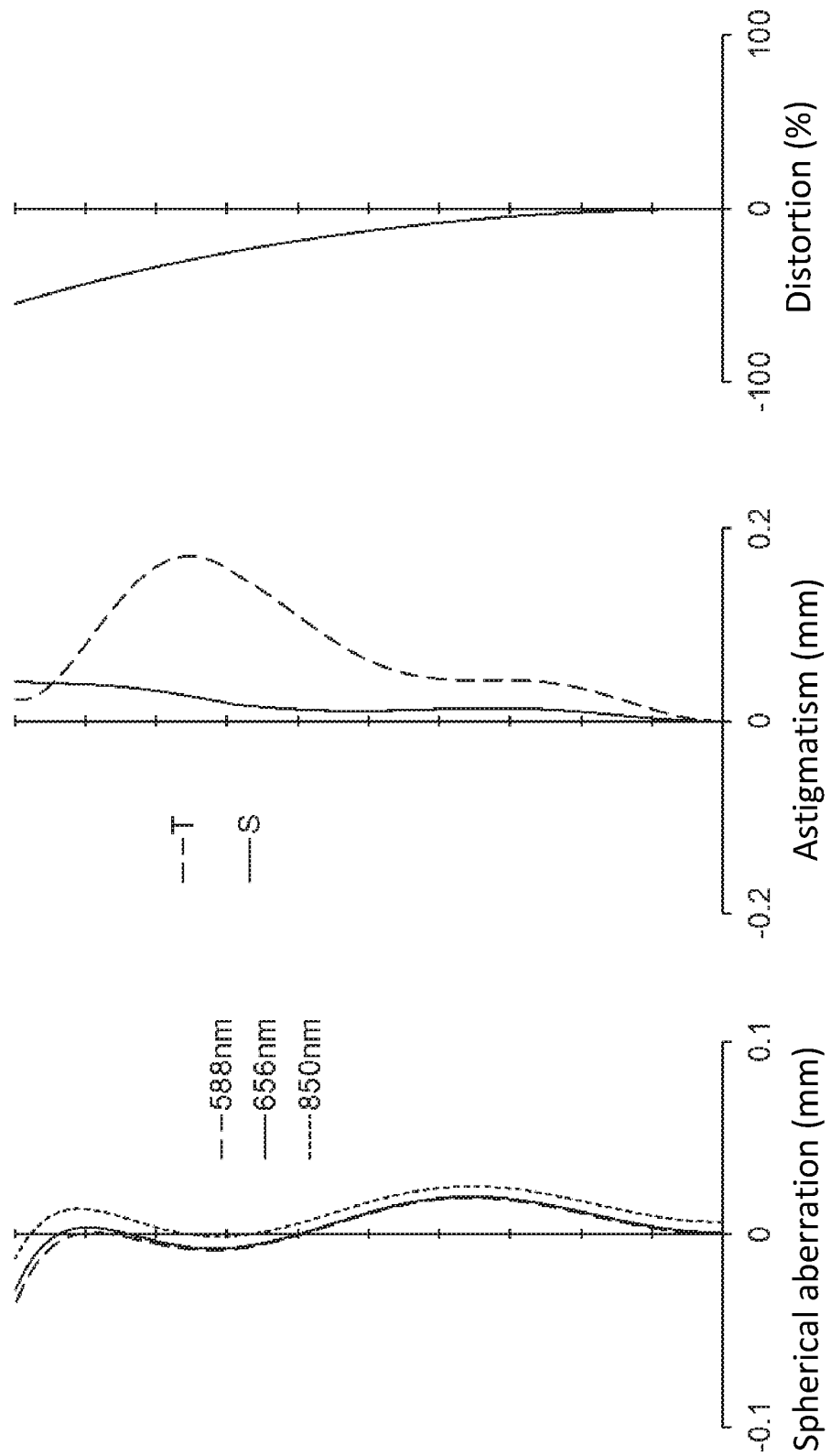
FIG. 3 is an aberration diagram showing a spherical aberration, astigmatism, and a distortion of the imaging lens of FIG. 1.
Figure 4:
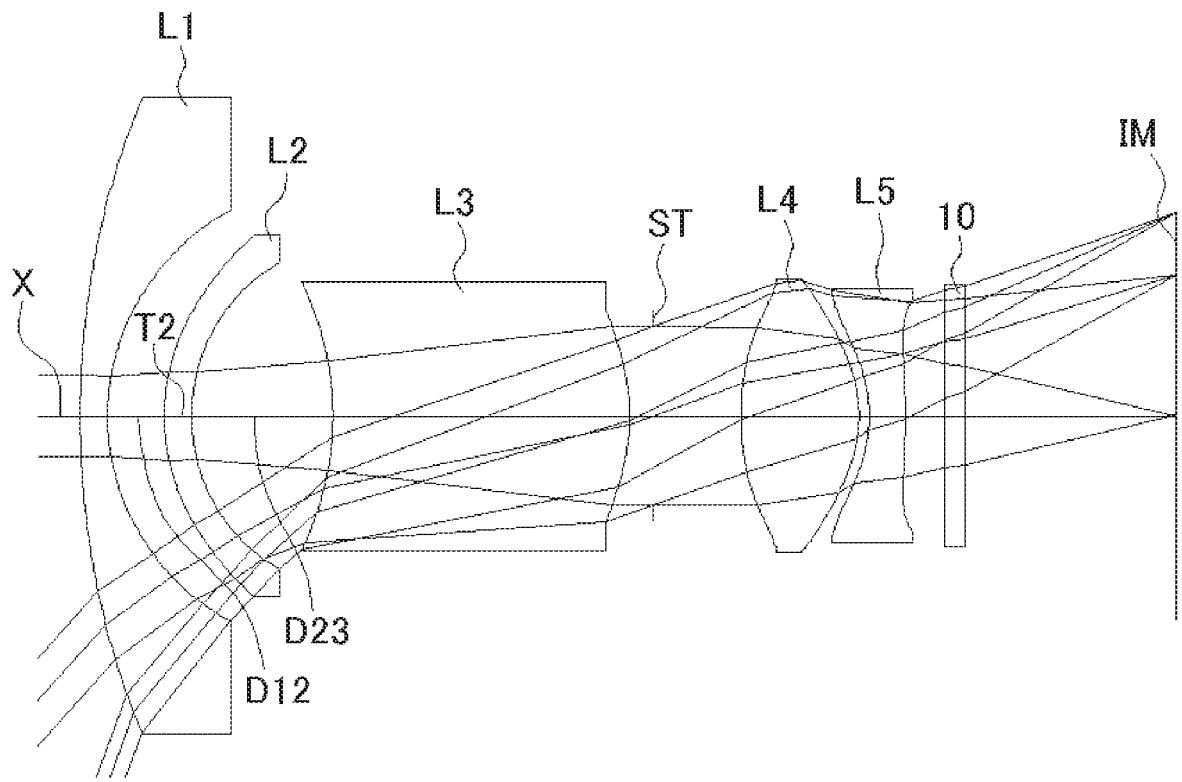
FIG. 4 shows a sectional view of a schematic configuration of an imaging lens in Numerical Data Example 2 of the present invention.

FIG. 2 shows a lateral aberration that corresponds to a half angle of view ω, which is divided into a tangential direction and a sagittal direction (The same is true for FIGS. 5, 8, 11, 14, 17, and 20). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

NUMERICAL DATA EXAMPLE 2

Basic Lens Data

TABLE 3

| | | f = 2.63 mm Fno = 2.2 ω = 70.0° | | | | | |
|---|---|---|---|---|---|---|---|
| | i | r | d | nd | nir | vd | [mm] |
| L1 | 1* | ∞ | ∞ | | | | |
| | | 12.912 | 0.400 | 1.5348 | 1.5274 | 55.7 | f1 = −8.644 |
| | 2* | 3.367 | 0.828 | | | | |
| L2 | 3* | 2.947 | 0.400 | 1.5348 | 1.5274 | 55.7 | f2 = −100.202 |
| | 4* | 2.661 | 2.063 | | | | |
| L3 | 5* | −4.263 | 4.329 | 1.5348 | 1.5274 | 55.7 | f3 = 8.875 |
| | 6* | −3.041 | 0.341 | | | | |
| ST | 7 | ∞ | 1.289 | | | | |
| L4 | 8* | 4.528 | 1.722 | 1.5348 | 1.5274 | 55.7 | f4 = 2.807 |
| | 9* | −1.948 | 0.146 | | | | |
| L5 | 10* | −2.264 | 0.522 | 1.6503 | 1.6291 | 21.5 | f5 = −3.911 |
| | 11* | −22.495 | 0.577 | | | | |
| | 12 | ∞ | 0.300 | 1.5168 | | 64.2 | |
| | 13 | ∞ | 3.089 | | | | |
| (IM) | | ∞ | | | | | |

$T2$=0.400 mm
$T3$=4.329 mm
fd=2.634 mm
fir=2.641 mm
f12=−7.543 mm
La=15.904 mm
Dep=1.200 mm

TABLE 4

Aspherical surface data

| i | k | A4 | A6 | A8 | A10 | A12 | A14 | A16 |
|---|---|---|---|---|---|---|---|---|
| 1 | 1.455E+00 | 0.000E+00 | 0.000E+00 | 0.000E+00 | 0.000E+00 | 0.000E+00 | 0.000E+00 | 0.000E+00 |
| 2 | −6.341E−02 | 0.000E+00 | 0.000E+00 | 0.000E+00 | 0.000E+00 | 0.000E+00 | 0.000E+00 | 0.000E+00 |
| 3 | −5.593E−01 | 0.000E+00 | 0.000E+00 | 0.000E+00 | 0.000E+00 | 0.000E+00 | 0.000E+00 | 0.000E+00 |
| 4 | 1.015E−01 | 0.000E+00 | 0.000E+00 | 0.000E+00 | 0.000E+00 | 0.000E+00 | 0.000E+00 | 0.000E+00 |
| 5 | 0.000E+00 | 2.044E−03 | −4.103E−04 | 7.368E−05 | −1.695E−06 | 0.000E+00 | 0.000E+00 | 0.000E+00 |
| 6 | 3.536E−01 | 1.426E−02 | 1.931E−03 | −9.880E−04 | 1.948E−04 | 0.000E+00 | 0.000E+00 | 0.000E+00 |
| 8 | 0.000E+00 | 1.633E−02 | 5.821E−03 | −6.248E−03 | 1.955E−03 | −1.564E−04 | −6.389E−05 | 1.090E−05 |
| 9 | −6.852E+00 | −7.967E−02 | 6.423E−02 | −3.384E−02 | 1.074E−02 | −1.899E−03 | 1.483E−04 | −1.704E−06 |
| 10 | 0.000E+00 | −2.625E−02 | 4.034E−02 | −1.036E−02 | −8.553E−04 | 1.482E−03 | −3.761E−04 | 3.275E−05 |
| 11 | 0.000E+00 | −3.107E−02 | 3.139E−02 | −7.919E−03 | 1.084E−03 | 2.345E−05 | 3.723E−05 | −1.195E−05 |

Figure 5:
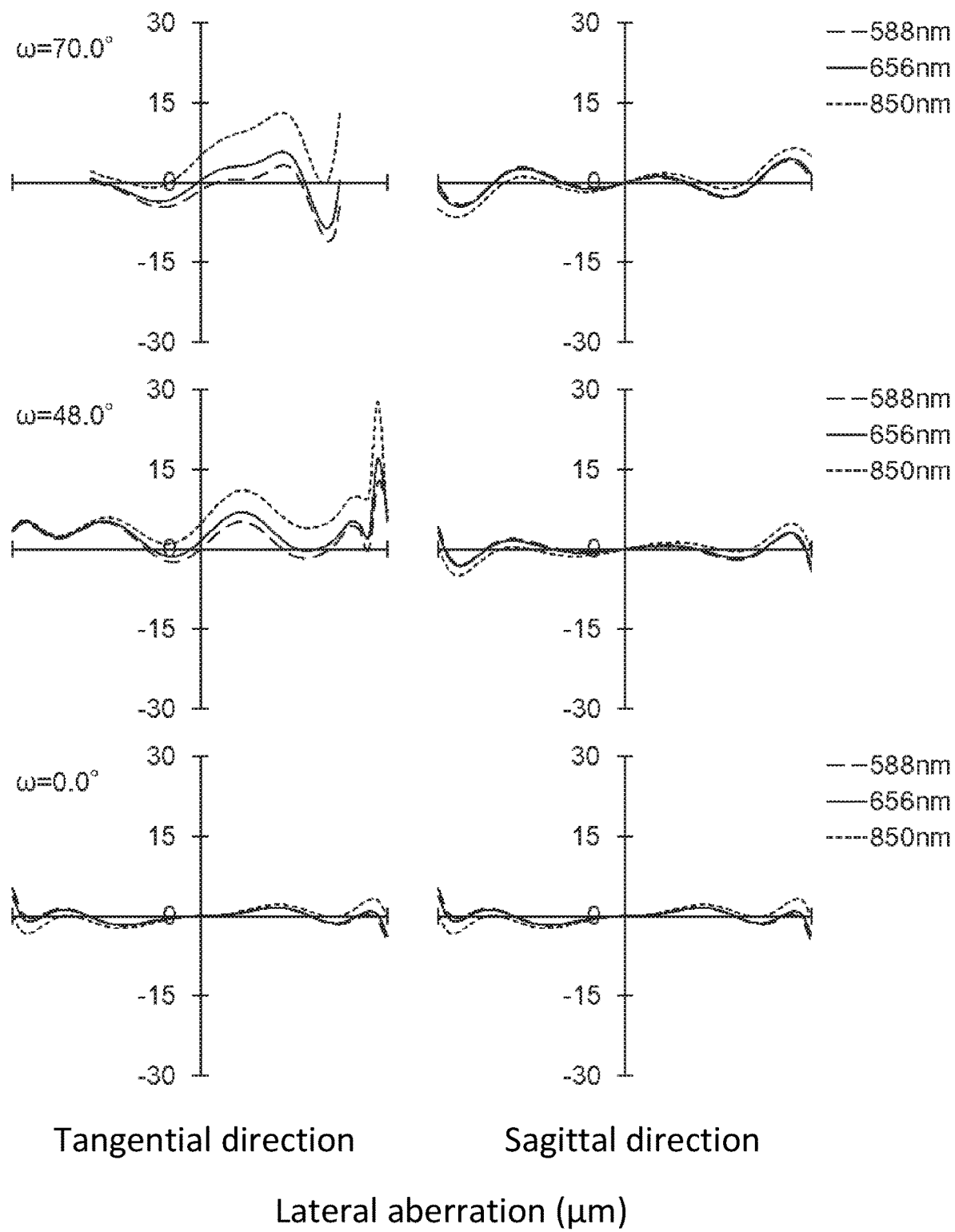
FIG. 5 is an aberration diagram showing a lateral aberration of the imaging lens of FIG. 4.
Figure 6:
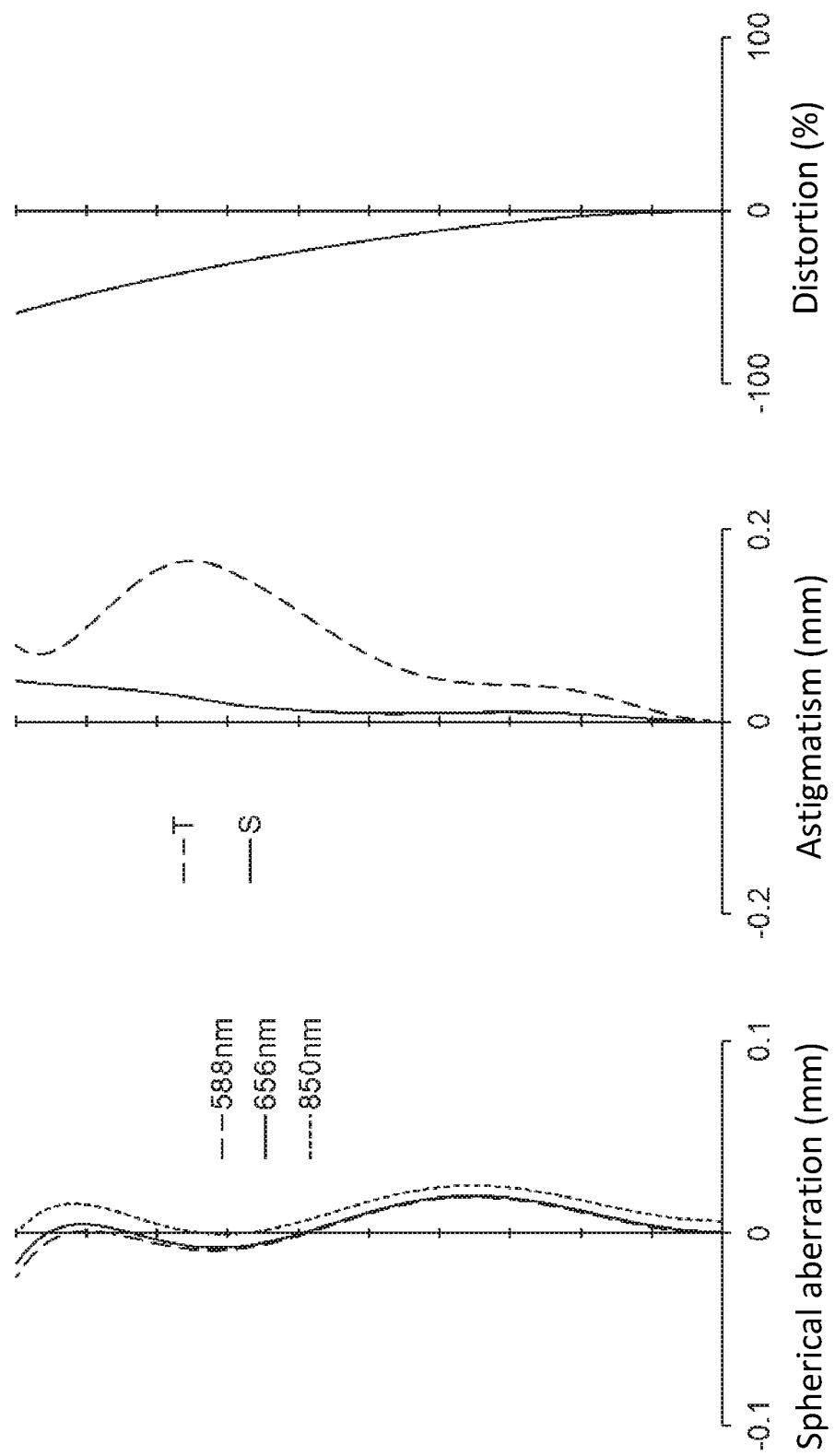
FIG. 6 is an aberration diagram showing a spherical aberration, astigmatism, and a distortion of the imaging lens of FIG. 4.
Figure 7:
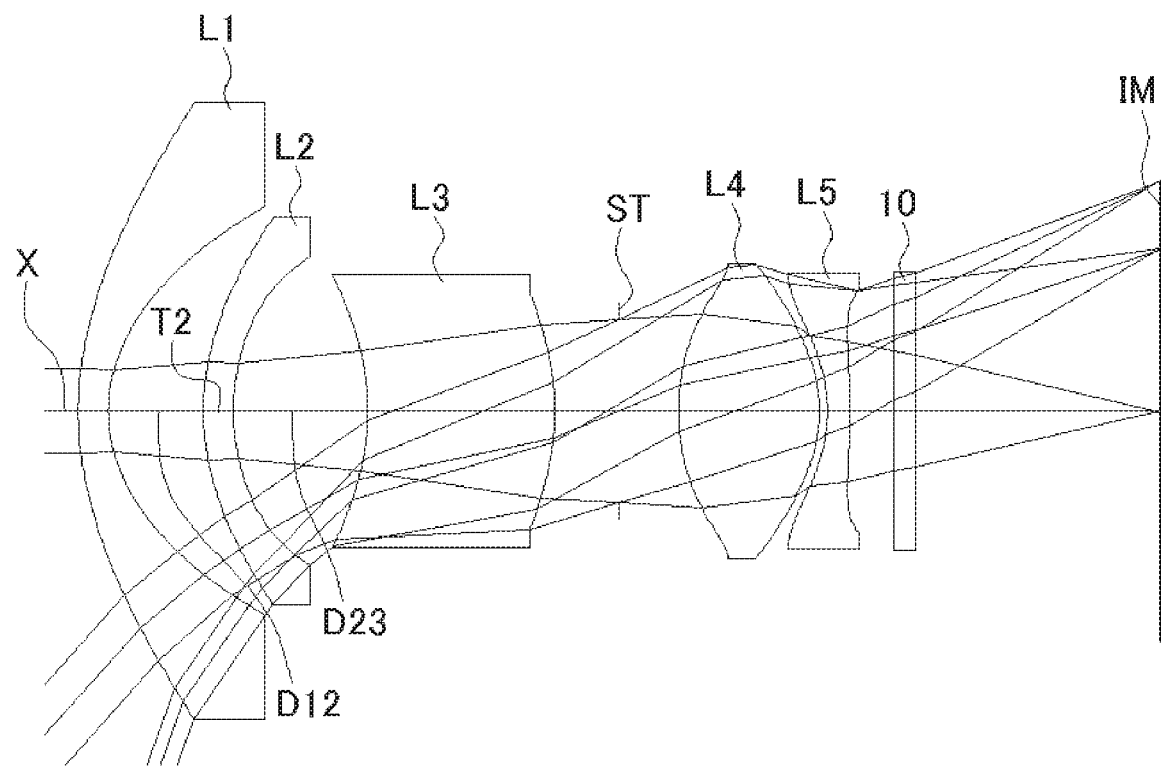
FIG. 7 shows a sectional view of a schematic configuration of an imaging lens in Numerical Data Example 3 of the present invention.

The values of the respective conditional expressions are as follows:

$f1/f2 = 0.086$ $f2/f = -38.046$ $D12/f = 0.314$ $D23/f = 0.783$ $f2/f3 = -11.290$ $f12/f3 = -0.850$ $T2/f = 0.152$ $T3/f = 1.644$ $f4/f = 1.066$ $f4/f5 = -0.718$ $fir/fd = 1.003$ $La/f = 6.039$ $f/\mathrm{Dep} = 2.2$ $f3/f4 = 3.162$ $R2r/R3f = -0.624$ Accordingly, the imaging lens of Numerical Data Example 2 satisfies the above-described conditional expressions. FIG. 5 shows a lateral aberration that corresponds to the half angle of view ω, and FIG. 6 shows the spherical aberration (mm), astigmatism (mm), and the distortion (%), respectively. As shown in FIGS. 5 and 6, according to the imaging lens of Numerical Data Example 2, the aberrations are also satisfactorily corrected.

NUMERICAL DATA EXAMPLE 3

Basic Lens Data

TABLE 5 f = 2.50 mm  Fno = 2.2  ω = 70.0°

| | i | r | d | nd | nir | vd | [mm] |
|---|---|---|---|---|---|---|---|
| | | ∞ | ∞ | | | | |
| L1 | 1* | 4.495 | 0.400 | 1.5348 | 1.5274 | 55.7 | f1 = −7.238 |
| | 2* | 2.015 | 1.264 | | | | |
| L2 | 3* | 3.309 | 0.400 | 1.5348 | 1.5274 | 55.7 | f2 = −100.185 |
| | 4* | 2.985 | 1.786 | | | | |
| L3 | 5* | −3.253 | 2.484 | 1.5348 | 1.5274 | 55.7 | f3 = 25.859 |
| | 6* | −3.334 | 0.845 | | | | |
| ST | 7 | ∞ | 0.797 | | | | |
| L4 | 8* | 2.988 | 1.877 | 1.5348 | 1.5274 | 55.7 | f4 = 2.486 |
| | 9* | −1.871 | 0.101 | | | | |
| L5 | 10* | −2.263 | 0.296 | 1.6503 | 1.6291 | 21.5 | f5 = −4.007 |
| | 11* | −18.074 | 0.577 | | | | |
| | 12 | ∞ | 0.300 | 1.5168 | | 64.2 | |
| | 13 | ∞ | 3.238 | | | | |
| (IM) | | ∞ | | | | | |

$T2 = 0.400$ mm $T3 = 2.484$ mm $fd = 2.498$ mm $fir = 2.508$ mm $f12 = -6.409$ mm $La = 14.263$ mm $\mathrm{Dep} = 1.138$ mm

TABLE 6

Aspherical surface data

| i | k | A4 | A6 | A8 | A10 | A12 | A14 | A16 |
|---|---|---|---|---|---|---|---|---|
| 1 | −2.250E+00 | 0.000E+00 | 0.000E+00 | 0.000E+00 | 0.000E+00 | 0.000E+00 | 0.000E+00 | 0.000E+00 |
| 2 | −7.692E−01 | 0.000E+00 | 0.000E+00 | 0.000E+00 | 0.000E+00 | 0.000E+00 | 0.000E+00 | 0.000E+00 |
| 3 | −1.586E+00 | 0.000E+00 | 0.000E+00 | 0.000E+00 | 0.000E+00 | 0.000E+00 | 0.000E+00 | 0.000E+00 |
| 4 | 8.066E−01 | 0.000E+00 | 0.000E+00 | 0.000E+00 | 0.000E+00 | 0.000E+00 | 0.000E+00 | 0.000E+00 |
| 5 | 0.000E+00 | 9.108E−03 | −1.602E−03 | 4.841E−04 | −4.204E−05 | 0.000E+00 | 0.000E+00 | 0.000E+00 |
| 6 | 1.334E+00 | 1.235E−02 | 3.296E−03 | −9.036E−04 | 1.823E−04 | 0.000E+00 | 0.000E+00 | 0.000E+00 |
| 8 | 0.000E+00 | 7.106E−03 | 6.463E−03 | −6.224E−03 | 1.944E−03 | −1.614E−04 | −6.430E−05 | 1.089E−05 |

TABLE 6-continued

Aspherical surface data

| i | k | A4 | A6 | A8 | A10 | A12 | A14 | A16 |
|---|---|----|----|----|-----|-----|-----|-----|
| 9 | −5.737E+00 | −6.939E−02 | 4.816E−02 | −2.305E−02 | 6.835E−03 | −1.092E−03 | 5.902E−05 | 2.279E−06 |
| 10 | 0.000E+00 | −2.728E−02 | 4.023E−02 | −1.029E−02 | −7.924E−04 | 1.496E−03 | −3.754E−04 | 3.206E−05 |
| 11 | 0.000E+00 | −3.015E−02 | 3.905E−02 | −1.265E−02 | 2.561E−03 | 3.141E−05 | −5.638E−05 | 8.108E−06 |

Figure 8:
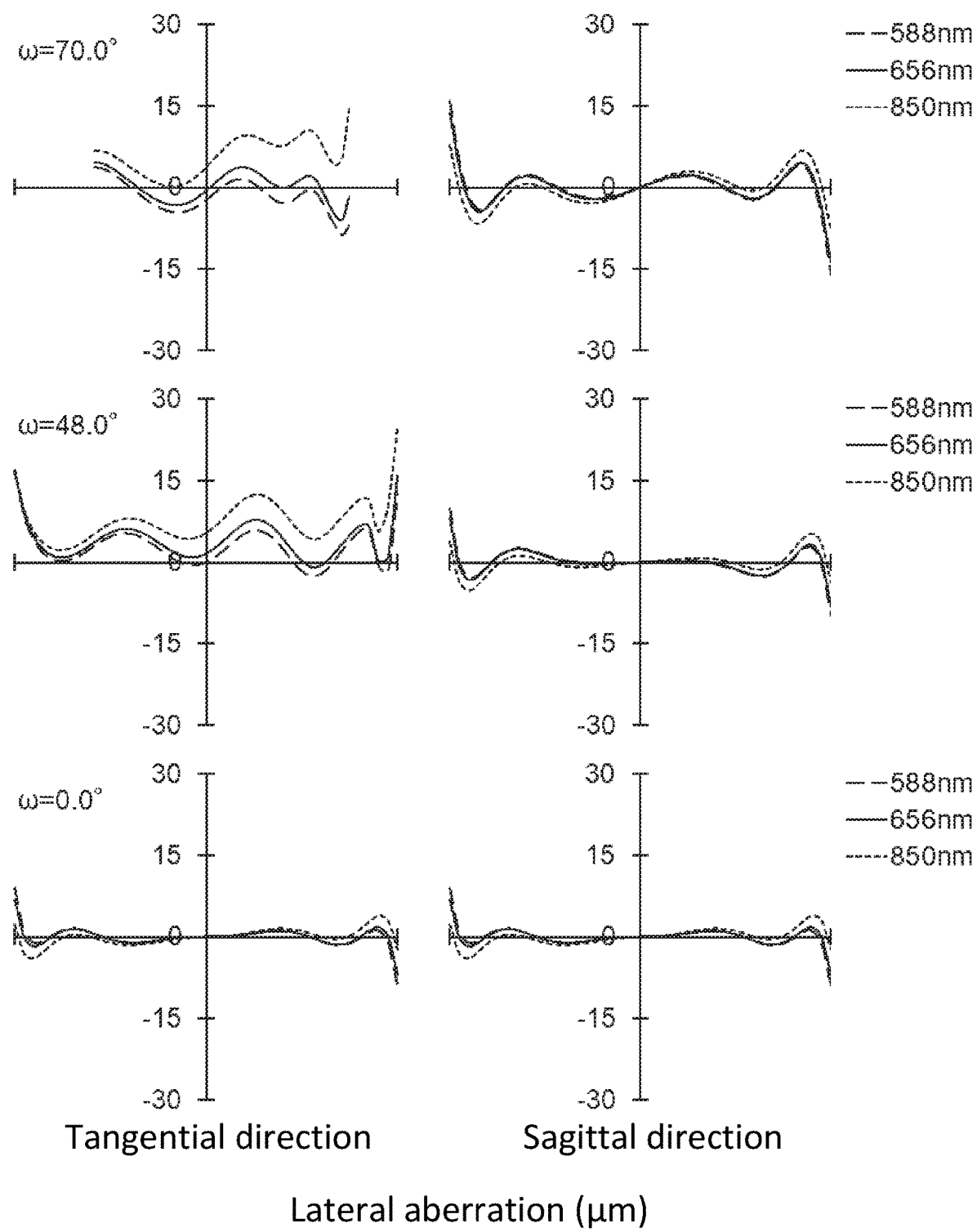
FIG. 8 is an aberration diagram showing a lateral aberration of the imaging lens of FIG. 7.
Figure 9:
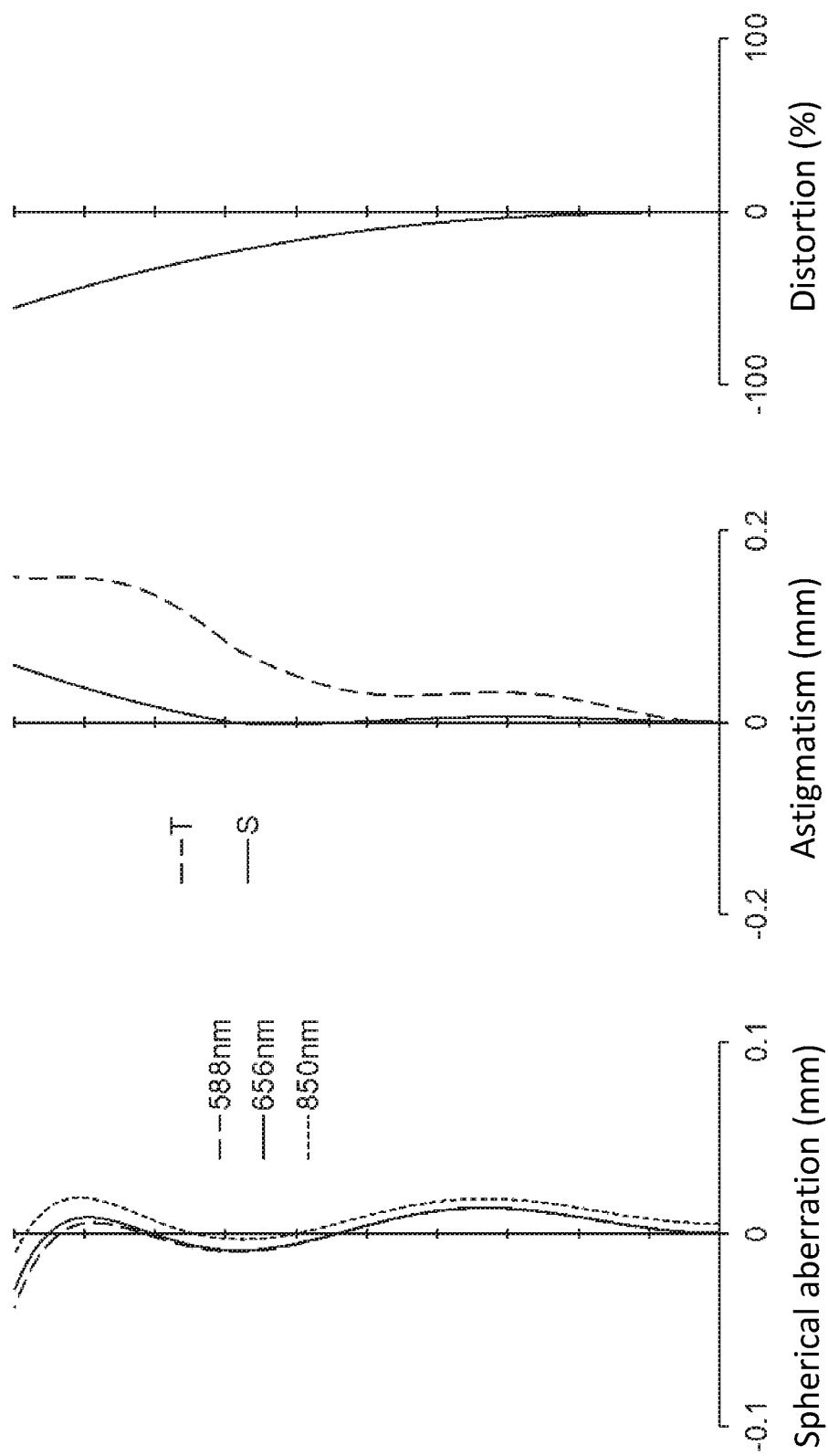
FIG. 9 is an aberration diagram showing a spherical aberration, astigmatism, and a distortion of the imaging lens of FIG. 7.
Figure 10:
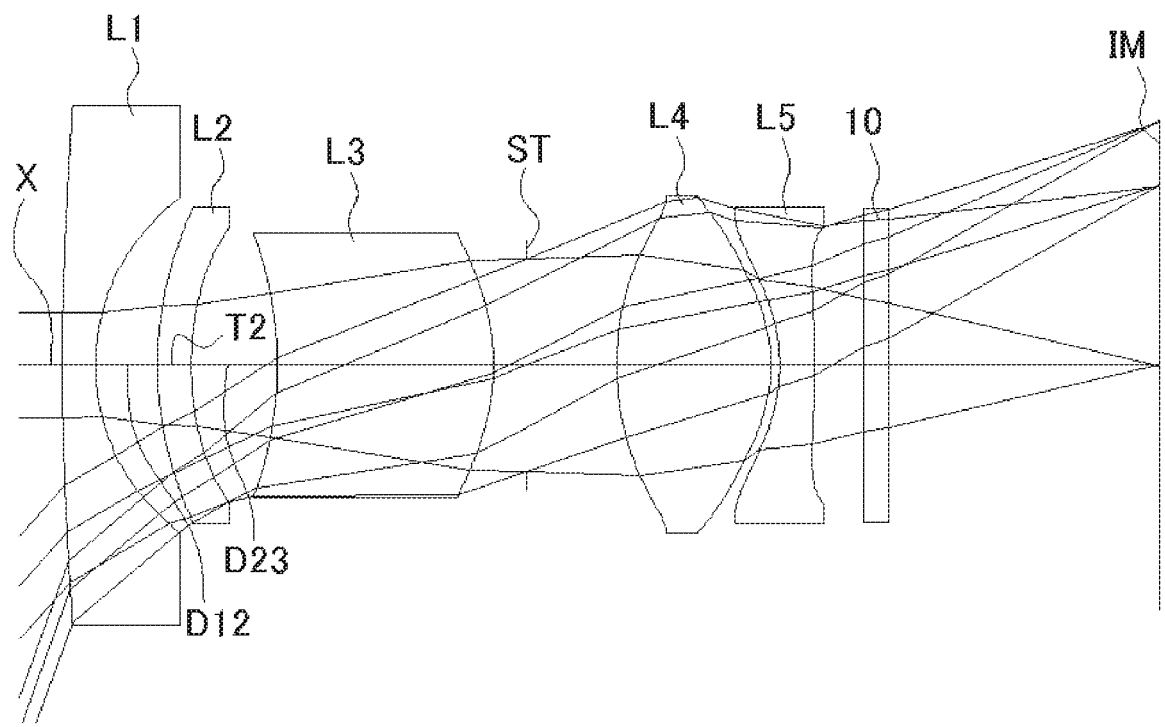
FIG. 10 shows a sectional view of a schematic configuration of an imaging lens in Numerical Data Example 4 of the present invention.

The values of the respective conditional expressions are as follows:

$f1/f2 = 0.072$ $f2/f = -40.100$ $D12/f = 0.506$ $D23/f = 0.715$ $f2/f3 = -3.874$ $f12/f3 = -0.248$ $T2/f = 0.160$ $T3/f = 0.994$ $f4/f = 0.995$ $f4/f5 = -0.621$ $fir/fd = 1.004$ $La/f = 5.709$ $f/\text{Dep} = 2.2$ $f3/f4 = 10.401$ $R2r/R3f = -0.918$ Accordingly, the imaging lens of Numerical Data Example 3 satisfies the above-described conditional expressions. FIG. 8 shows a lateral aberration that corresponds to the half angle of view ω, and FIG. 9 shows the spherical aberration (mm), the astigmatism (mm), and the distortion (%), respectively. As shown in FIGS. 8 and 9, according to the imaging lens of Numerical Data Example 3, the aberrations are also satisfactorily corrected.

NUMERICAL DATA EXAMPLE 4

Basic Lens Data

TABLE 7 f = 2.74 mm Fno = 2.2 ω = 70.0°

| | i | r | d | nd | nir | vd | [mm] |
|---|---|---|---|----|----|----|------|
| | | ∞ | ∞ | | | | |
| L1 | 1* | 26.003 | 0.400 | 1.5348 | 1.5274 | 55.7 | f1 = −5.120 |
| | 2* | 2.464 | 0.733 | | | | |
| L2 | 3* | 4.130 | 0.400 | 1.5348 | 1.5274 | 55.7 | f2 = −100.244 |
| | 4* | 3.705 | 1.021 | | | | |
| L3 | 5* | −4.371 | 2.562 | 1.5348 | 1.5274 | 55.7 | f3 = 8.196 |
| | 6* | −2.636 | 0.385 | | | | |
| ST | 7 | ∞ | 1.079 | | | | |
| L4 | 8* | 3.772 | 1.824 | 1.5348 | 1.5274 | 55.7 | f4 = 2.647 |
| | 9* | −1.884 | 0.100 | | | | |
| L5 | 10* | −2.260 | 0.412 | 1.6503 | 1.6291 | 21.5 | f5 = −3.929 |
| | 11* | −21.015 | 0.577 | | | | |
| | 12 | ∞ | 0.300 | 1.5168 | | 64.2 | |
| | 13 | ∞ | 3.216 | | | | |
| (IM) | | ∞ | | | | | |

T2=0.400 mm

T3=2.562 mm fd=2.739 mm fir=2.747 mm f12=−4.673 mm

La=12.907 mm

Dep=1.248 mm

TABLE 8

Aspherical surface data

| i | k | A4 | A6 | A8 | A10 | A12 | A14 | A16 |
|---|---|----|----|----|-----|-----|-----|-----|
| 1 | −1.934E+02 | 0.000E+00 | 0.000E+00 | 0.000E+00 | 0.000E+00 | 0.000E+00 | 0.000E+00 | 0.000E+00 |
| 2 | −8.206E−03 | 0.000E+00 | 0.000E+00 | 0.000E+00 | 0.000E+00 | 0.000E+00 | 0.000E+00 | 0.000E+00 |
| 3 | −9.229E−01 | 0.000E+00 | 0.000E+00 | 0.000E+00 | 0.000E+00 | 0.000E+00 | 0.000E+00 | 0.000E+00 |
| 4 | 2.396E+00 | 0.000E+00 | 0.000E+00 | 0.000E+00 | 0.000E+00 | 0.000E+00 | 0.000E+00 | 0.000E+00 |
| 5 | 0.000E+00 | 2.817E−03 | −1.168E−03 | 2.058E−04 | 1.088E−05 | 0.000E+00 | 0.000E+00 | 0.000E+00 |
| 6 | 5.190E−01 | 1.622E−02 | 1.984E−03 | −8.682E−04 | 2.419E−04 | 0.000E+00 | 0.000E+00 | 0.000E+00 |
| 8 | 0.000E+00 | 1.473E−02 | 5.570E−03 | −6.132E−03 | 1.962E−03 | −1.612E−04 | −6.517E−05 | 1.108E−05 |
| 9 | −6.277E+00 | −8.161E−02 | 6.457E−02 | −3.374E−02 | 1.074E−02 | −1.903E−03 | 1.482E−04 | −1.648E−06 |
| 10 | 0.000E+00 | −2.667E−02 | 3.996E−02 | −1.035E−02 | −8.131E−04 | 1.492E−03 | −3.762E−04 | 3.227E−05 |
| 11 | 0.000E+00 | −2.789E−02 | 3.100E−02 | −7.884E−03 | 1.146E−03 | 1.948E−05 | 3.020E−05 | −8.230E−06 |

Figure 11:
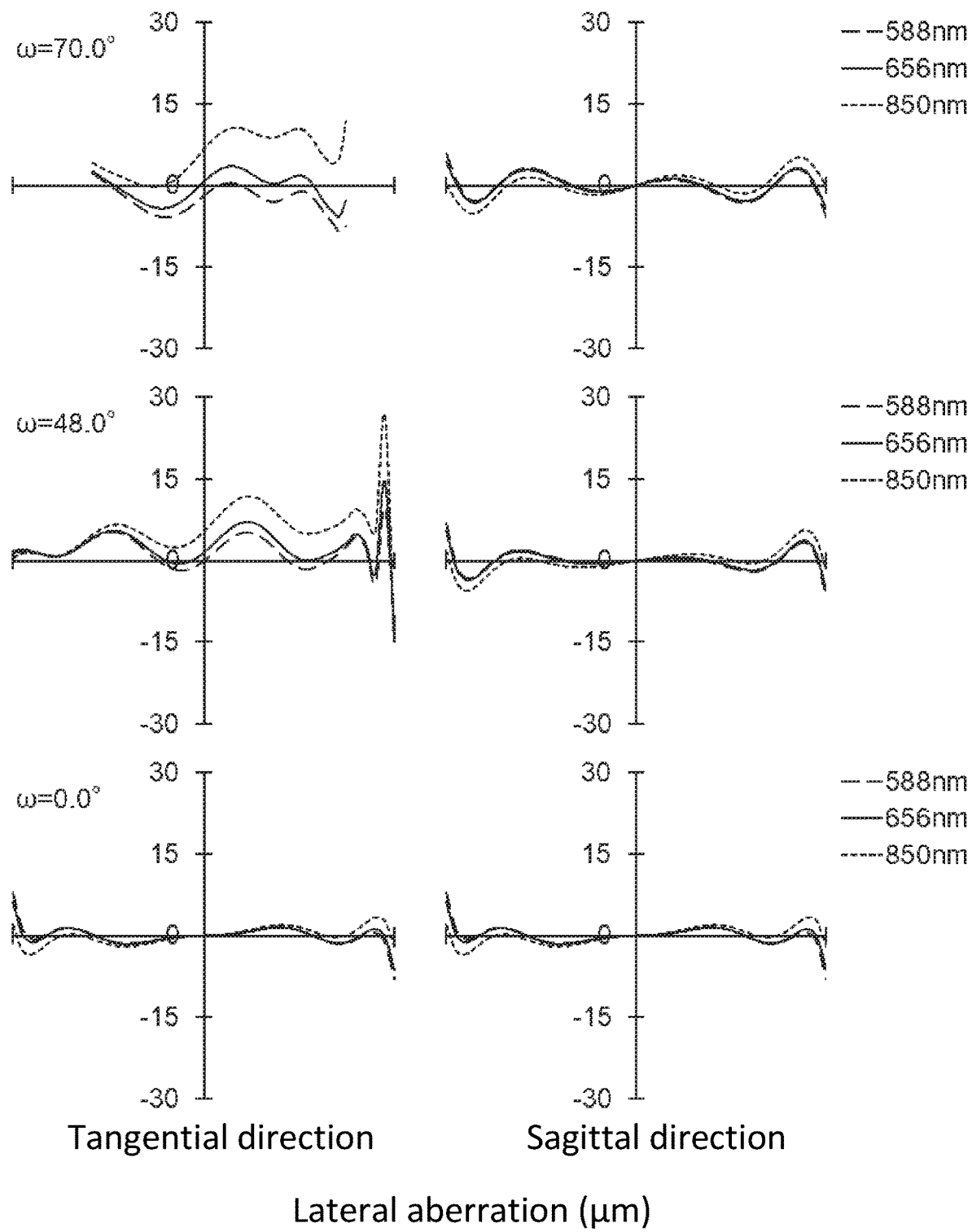
FIG. 11 is an aberration diagram showing a lateral aberration of the imaging lens of FIG. 10.
Figure 12:
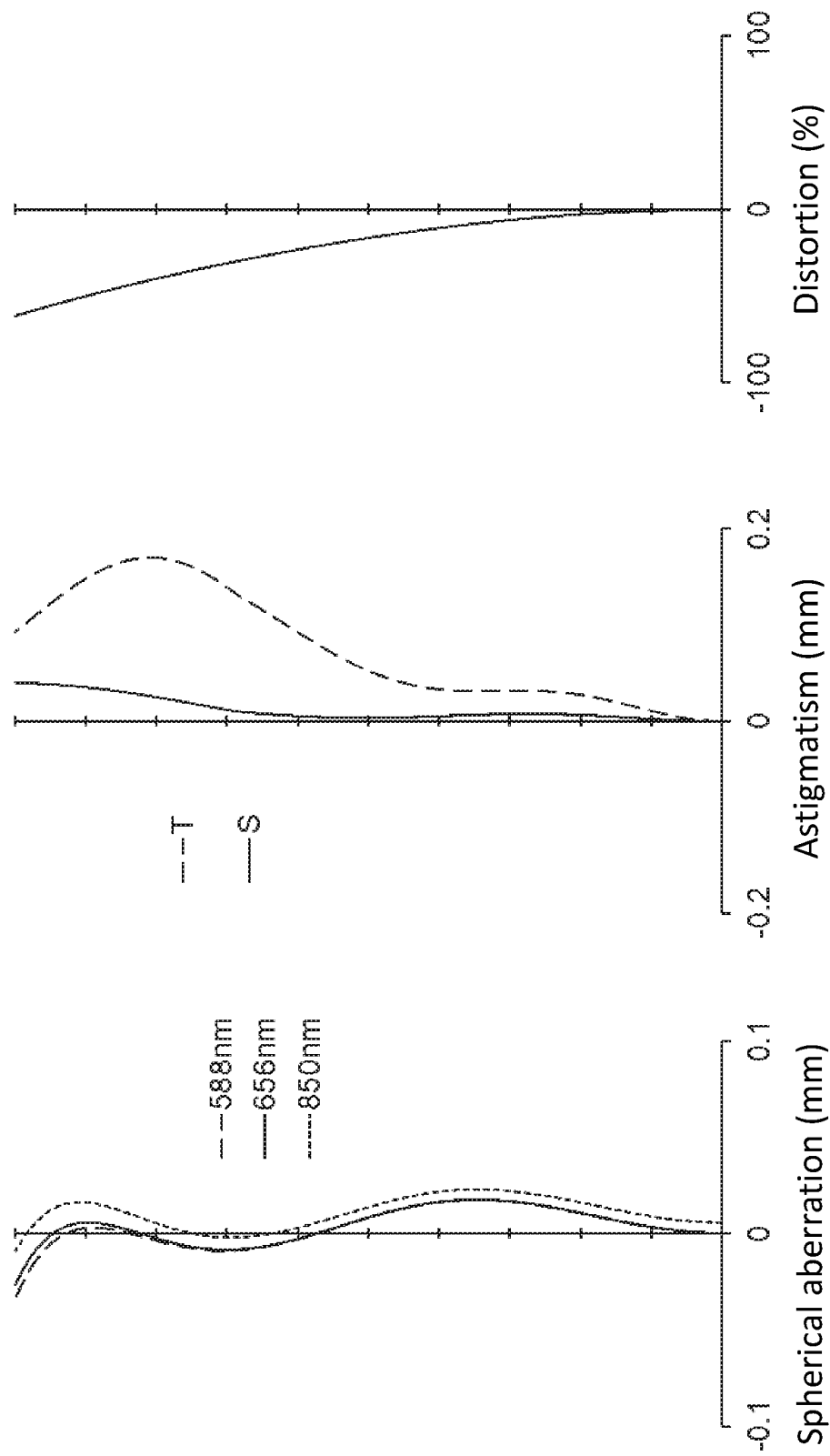
FIG. 12 is an aberration diagram showing a spherical aberration, astigmatism, and a distortion of the imaging lens of FIG. 10.
Figure 13:
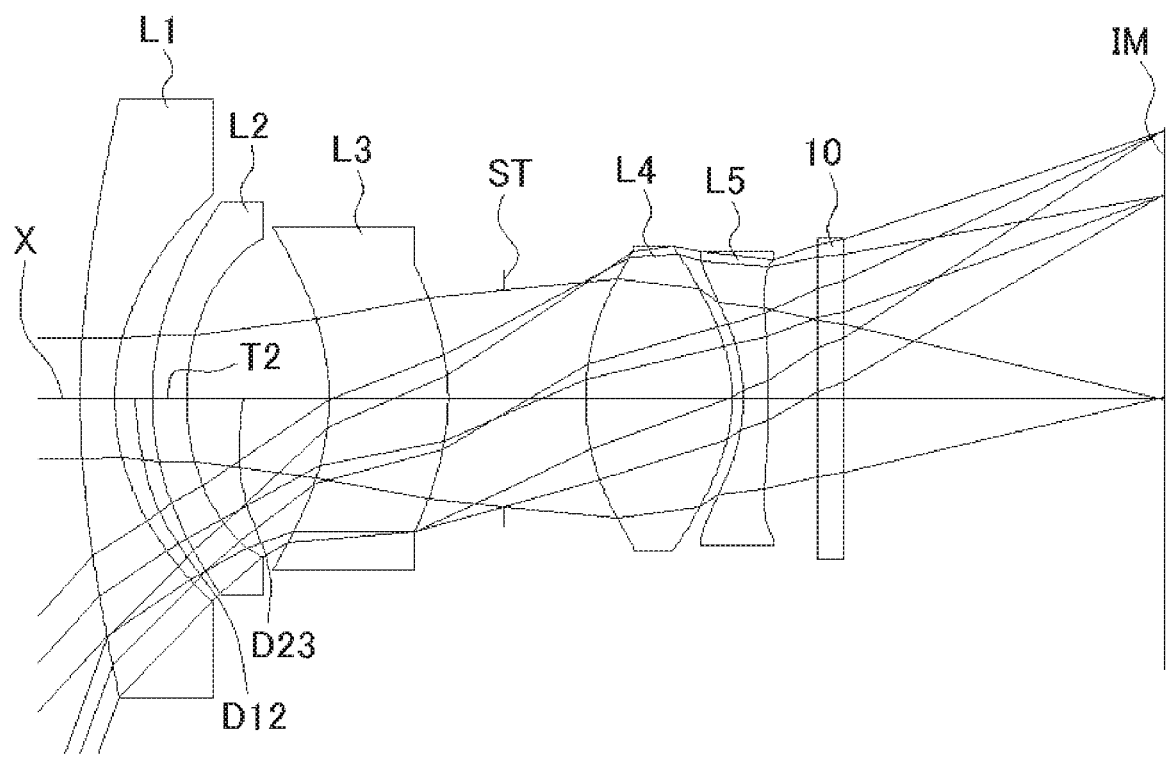
FIG. 13 shows a sectional view of a schematic configuration of an imaging lens in Numerical Data Example 5 of the present invention.

The values of the respective conditional expressions are as follows:

$f1/f2 = 0.051$ $f2/f = -36.603$ $D12/f = 0.267$ $D23/f=0.373$ $f2/f3=-12.231$ $f12/f3=-0.570$ $T2/f=0.146$ $T3/f=0.936$ $f4/f=0.966$ $f4/f5=-0.674$ $fir/fd=1.003$ $La/f=4.713$ $f/Dep=2.2$ $f3/f4=3.097$ $R2r/R3f=-0.848$ Accordingly, the imaging lens of Numerical Data Example 4 satisfies the above-described conditional expressions. FIG. 11 shows a lateral aberration that corresponds to the half angle of view ω, and FIG. 12 shows the spherical aberration (mm), the astigmatism (mm), and the distortion (%), respectively. As shown in FIGS. 11 and 12, according to the imaging lens of Numerical Data Example 4, the aberrations are also satisfactorily corrected.

NUMERICAL DATA EXAMPLE 5

Basic Lens Data

TABLE 9 f = 3.11 mm Fno = 2.2 ω = 70.0°

| | i | r | d | nd | nir | vd | [mm] |
|---|---|---|---|---|---|---|---|
| L1 | 1* | 10.153 | 0.400 | 1.5348 | 1.5274 | 55.7 | f1 = −7.227 |
| | 2* | 2.761 | 0.436 | | | | |
| L2 | 3* | 3.292 | 0.400 | 1.5348 | 1.5274 | 55.7 | f2 = −68.517 |
| | 4* | 2.892 | 1.651 | | | | |
| L3 | 5* | −2.916 | 1.382 | 1.5348 | 1.5274 | 55.7 | f3 = 37.126 |
| | 6* | −2.963 | 0.645 | | | | |
| ST | 7 | ∞ | 0.953 | | | | |
| L4 | 8* | 2.935 | 1.702 | 1.5348 | 1.5274 | 55.7 | f4 = 2.460 |
| | 9* | −1.903 | 0.125 | | | | |
| L5 | 10* | −2.248 | 0.293 | 1.6503 | 1.6291 | 21.5 | f5 = −4.299 |
| | 11* | −12.075 | 0.577 | | | | |
| | 12 | ∞ | 0.300 | 1.5168 | | 64.2 | |
| | 13 | ∞ | 3.714 | | | | |
| (IM) | | ∞ | | | | | |

T2=0.400 mm

T3=1.382 mm fd=3.110 mm fir=3.118 mm f12=−6.238 mm

La=12.476 mm

Dep=1.418 mm

TABLE 10

Aspherical surface data

| i | k | A4 | A6 | A8 | A10 | A12 | A14 | A16 |
|---|---|---|---|---|---|---|---|---|
| 1 | −1.503E+01 | 0.000E+00 | 0.000E+00 | 0.000E+00 | 0.000E+00 | 0.000E+00 | 0.000E+00 | 0.000E+00 |
| 2 | −4.770E−01 | 0.000E+00 | 0.000E+00 | 0.000E+00 | 0.000E+00 | 0.000E+00 | 0.000E+00 | 0.000E+00 |
| 3 | −9.549E−01 | 0.000E+00 | 0.000E+00 | 0.000E+00 | 0.000E+00 | 0.000E+00 | 0.000E+00 | 0.000E+00 |
| 4 | 1.119E+00 | 0.000E+00 | 0.000E+00 | 0.000E+00 | 0.000E+00 | 0.000E+00 | 0.000E+00 | 0.000E+00 |
| 5 | 0.000E+00 | 7.986E−03 | −1.464E−03 | 5.416E−04 | −2.892E−05 | 0.000E+00 | 0.000E+00 | 0.000E+00 |
| 6 | 1.256E+00 | 1.228E−02 | 3.395E−03 | −7.254E−04 | 2.900E−04 | 0.000E+00 | 0.000E+00 | 0.000E+00 |
| 8 | 0.000E+00 | 5.317E−03 | 6.310E−03 | −6.192E−03 | 1.960E−03 | −1.604E−04 | −6.550E−05 | 9.766E−06 |
| 9 | −5.963E+00 | −6.919E−02 | 4.829E−02 | −2.302E−02 | 6.832E−03 | −1.095E−03 | 5.830E−05 | 2.073E−06 |
| 10 | 0.000E+00 | −2.716E−02 | 4.043E−02 | −1.022E−02 | −7.605E−04 | 1.500E−03 | −3.756E−04 | 3.196E−05 |
| 11 | 0.000E+00 | −3.229E−02 | 3.840E−02 | −1.267E−02 | 2.587E−03 | 2.970E−05 | −5.822E−05 | 6.647E−06 |

Figure 14:
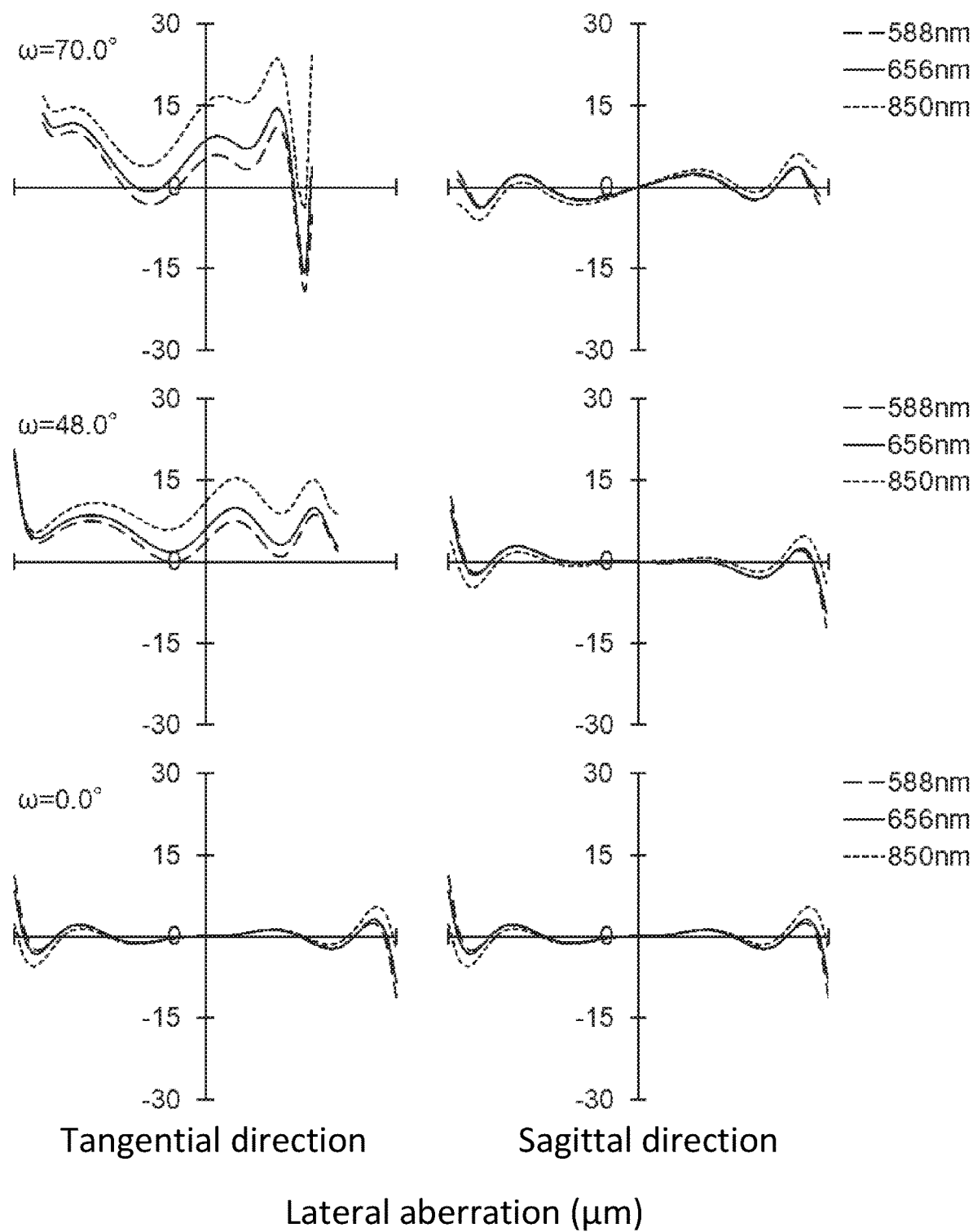
FIG. 14 is an aberration diagram showing a lateral aberration of the imaging lens of FIG. 13.
Figure 15:
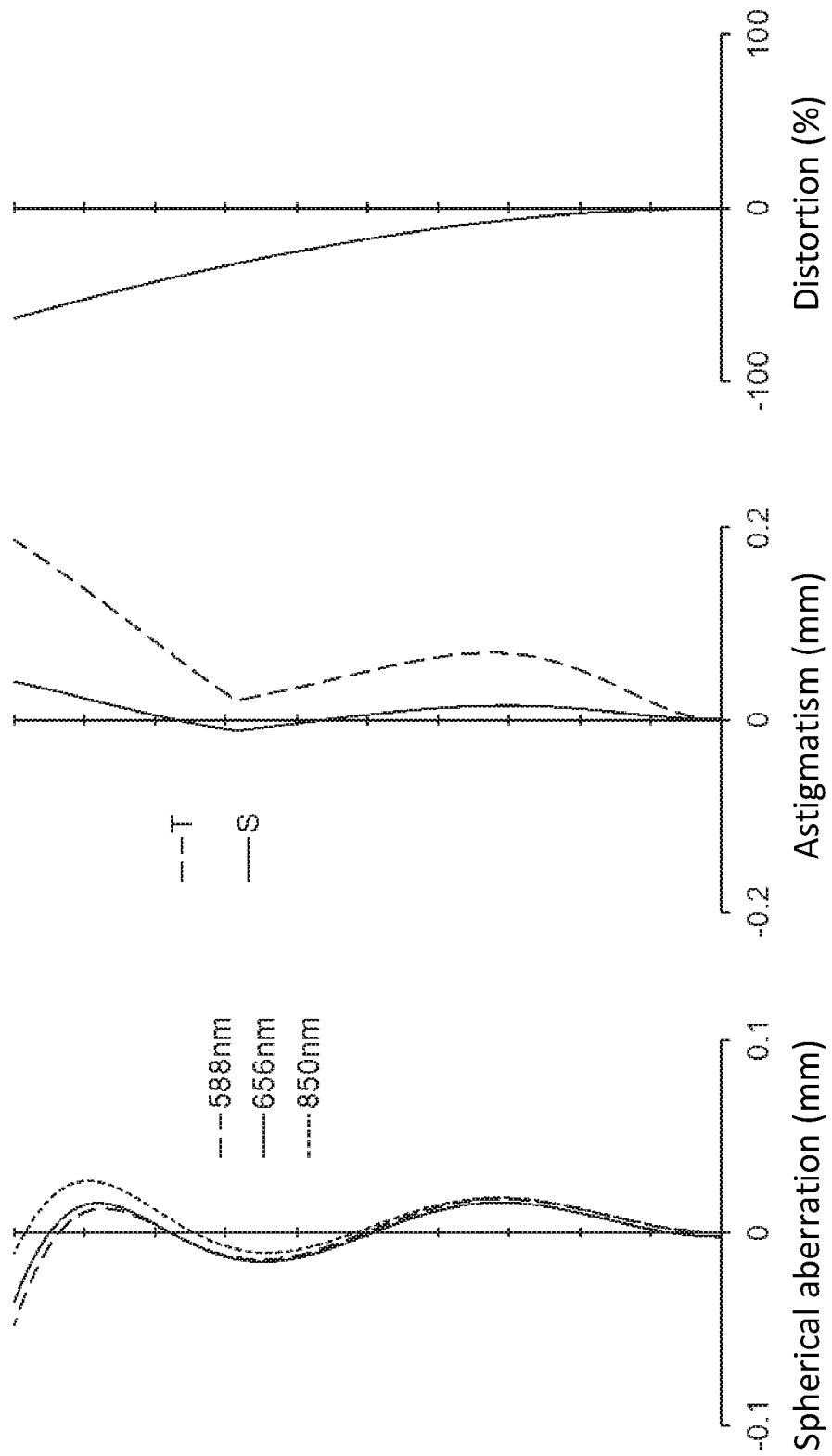
FIG. 15 is an aberration diagram showing a spherical aberration, astigmatism, and a distortion of the imaging lens of FIG. 13.
Figure 16:
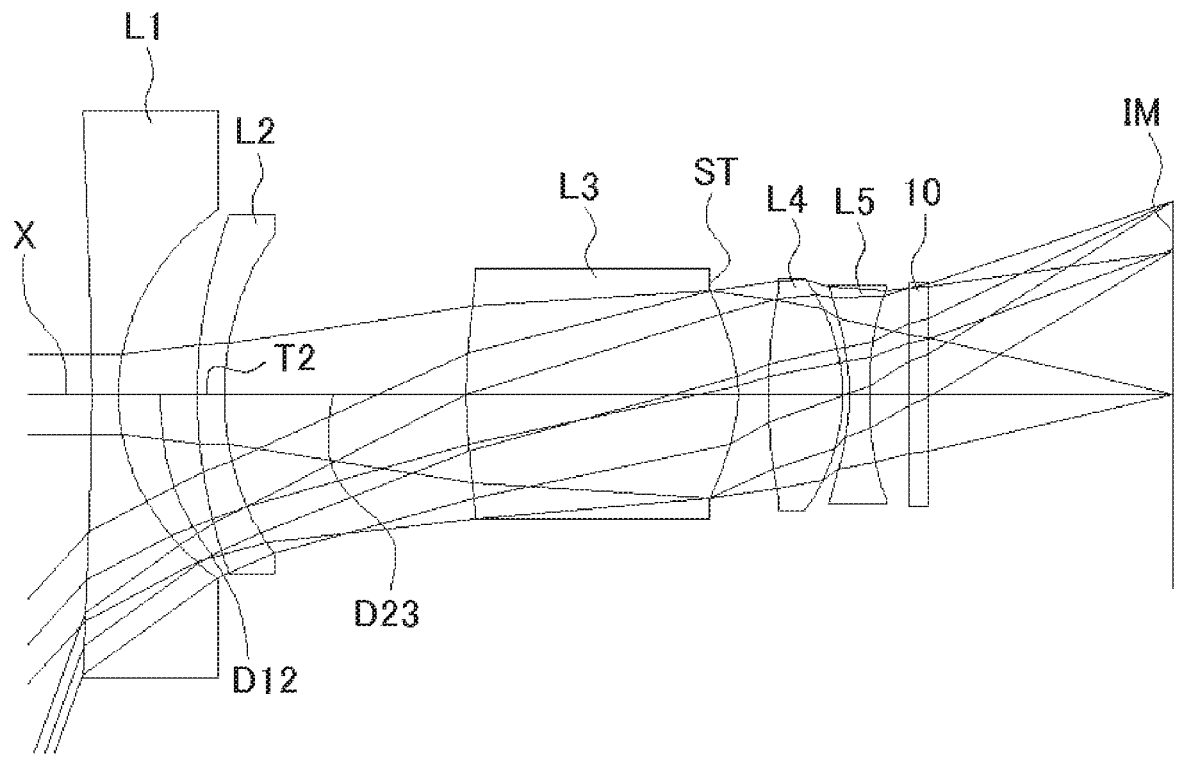
FIG. 16 shows a sectional view of a schematic configuration of an imaging lens in Numerical Data Example 6 of the present invention.

The values of the respective conditional expressions are as follows:

$f1/f2=0.105$ $f2/f=-22.031$ $D12/f=0.140$ $D23/f=0.531$ $f2/f3=-1.846$ $f12/f3=-0.168$ $T2/f=0.129$ $T3/f=0.444$ $f4/f=0.791$ $f4/f5=-0.572$ $fir/fd=1.003$ $La/f=4.012$ $f/Dep=2.2$ $f3/f4=15.093$ $R2r/R3f=-0.992$ Accordingly, the imaging lens of Numerical Data Example 5 satisfies the above-described conditional expressions. FIG. 14 shows a lateral aberration that corresponds to the half angle of view ω, and FIG. 15 shows the spherical aberration (mm), the astigmatism (mm), and the distortion (%), respectively. As shown in FIGS. 14 and 15, according to the imaging lens of Numerical Data Example 5, the aberrations are also satisfactorily corrected.

NUMERICAL DATA EXAMPLE 6

Basic Lens Data

TABLE 11

| | i | r | d | nd | nir | vd | [mm] |
|---|---|---|---|---|---|---|---|
| | | ∞ | ∞ | | | | |
| L1 | 1* | −43.251 | 0.400 | 1.5348 | 1.5274 | 55.7 | f1 = −5.451 |
| | 2* | 3.136 | 1.167 | | | | |
| L2 | 3* | 7.340 | 0.400 | 1.5348 | 1.5274 | 55.7 | f2 = −21.507 |
| | 4* | 4.395 | 3.585 | | | | |
| L3 | 5* | 8.097 | 4.020 | 1.5348 | 1.5274 | 55.7 | f3 = 3.711 |
| | 6* | −2.174 | −0.386 | | | | |
| ST | 7 | ∞ | 0.854 | | | | |
| L4 | 8* | −134.118 | 1.083 | 1.5348 | 1.5274 | 55.7 | f4 = 5.008 |
| | 9* | −2.633 | 0.098 | | | | |
| L5 | 10* | −3.823 | 0.299 | 1.6503 | 1.6291 | 21.5 | f5 = −3.603 |
| | 11* | 6.239 | 0.577 | | | | |
| | 12 | ∞ | 0.300 | 1.5168 | | 64.2 | |
| | 13 | ∞ | 3.615 | | | | |
| (IM) | | ∞ | | | | | |

T2=0.400 mm
T3=4.020 mm
fd=2.643 mm
fir=2.652 mm
f12=−4.067 mm
La=15.910 mm
Dep=1.205 mm $f12/f3 = -1.096$ $T2/f = 0.151$ $T3/f = 1.521$ $f4/f = 1.895$ $f4/f5 = -1.390$ $fir/fd = 1.003$ $La/f = 6.020$ $f/Dep = 2.2$

TABLE 12

| | | | | Aspherical surface data | | | | |
|---|---|---|---|---|---|---|---|---|
| i | k | A4 | A6 | A8 | A10 | A12 | A14 | A16 |
| 1 | −3.978E+02 | 0.000E+00 | 0.000E+00 | 0.000E+00 | 0.000E+00 | 0.000E+00 | 0.000E+00 | 0.000E+00 |
| 2 | −1.951E−01 | 0.000E+00 | 0.000E+00 | 0.000E+00 | 0.000E+00 | 0.000E+00 | 0.000E+00 | 0.000E+00 |
| 3 | −1.896E+00 | 0.000E+00 | 0.000E+00 | 0.000E+00 | 0.000E+00 | 0.000E+00 | 0.000E+00 | 0.000E+00 |
| 4 | 7.103E−01 | 0.000E+00 | 0.000E+00 | 0.000E+00 | 0.000E+00 | 0.000E+00 | 0.000E+00 | 0.000E+00 |
| 5 | 0.000E+00 | −4.330E−03 | −9.398E−04 | 1.451E−04 | −1.803E−05 | 0.000E+00 | 0.000E+00 | 0.000E+00 |
| 6 | −3.609E+00 | 1.739E−02 | −1.080E−02 | 2.558E−03 | −2.113E−04 | 0.000E+00 | 0.000E+00 | 0.000E+00 |
| 8 | 0.000E+00 | 6.921E−02 | −2.678E−02 | 1.385E−03 | 3.062E−03 | −7.957E−04 | −2.427E−04 | 7.871E−05 |
| 9 | −1.460E+01 | −6.612E−02 | 4.812E−02 | −2.804E−02 | 8.764E−03 | −9.620E−04 | −2.261E−04 | 5.850E−05 |
| 10 | 0.000E+00 | −8.440E−03 | 2.211E−02 | −1.035E−02 | −6.132E−04 | 1.625E−03 | −3.237E−04 | 1.332E−05 |
| 11 | 0.000E+00 | −6.720E−03 | 2.356E−02 | −1.278E−02 | 2.215E−03 | 3.796E−04 | −1.030E−04 | −6.187E−06 |

The values of the respective conditional expressions are as follows:

$f1/f2 = 0.253$ $f2/f = -8.138$ $D12/f = 0.442$ $D23/f = 1.357$ $f2/f3 = -5.796$

Accordingly, the imaging lens of Numerical Data Example 6 satisfies the above-described conditional expressions (1) through (18).

Figure 17:
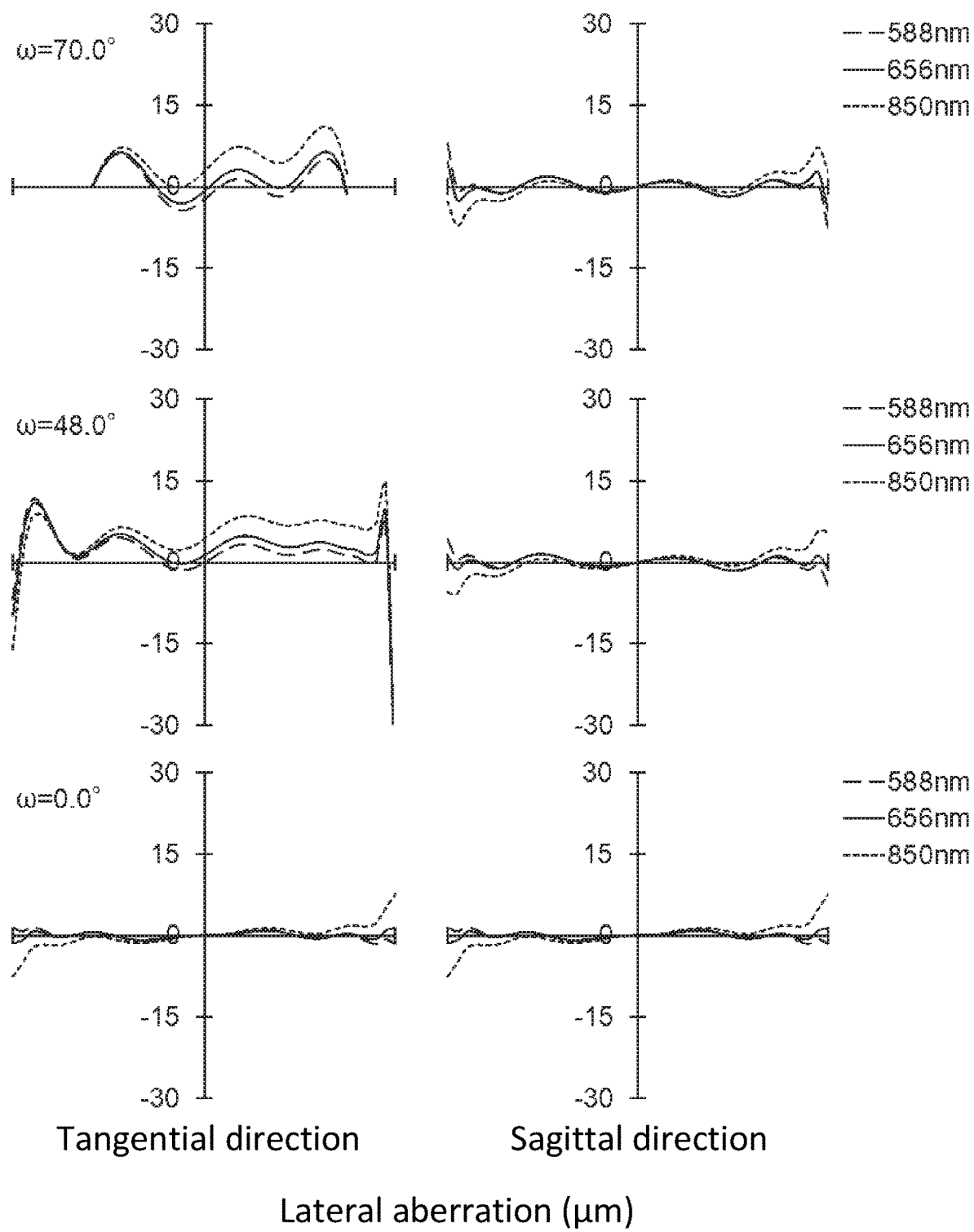
FIG. 17 is an aberration diagram showing a lateral aberration of the imaging lens of FIG. 16.
Figure 18:
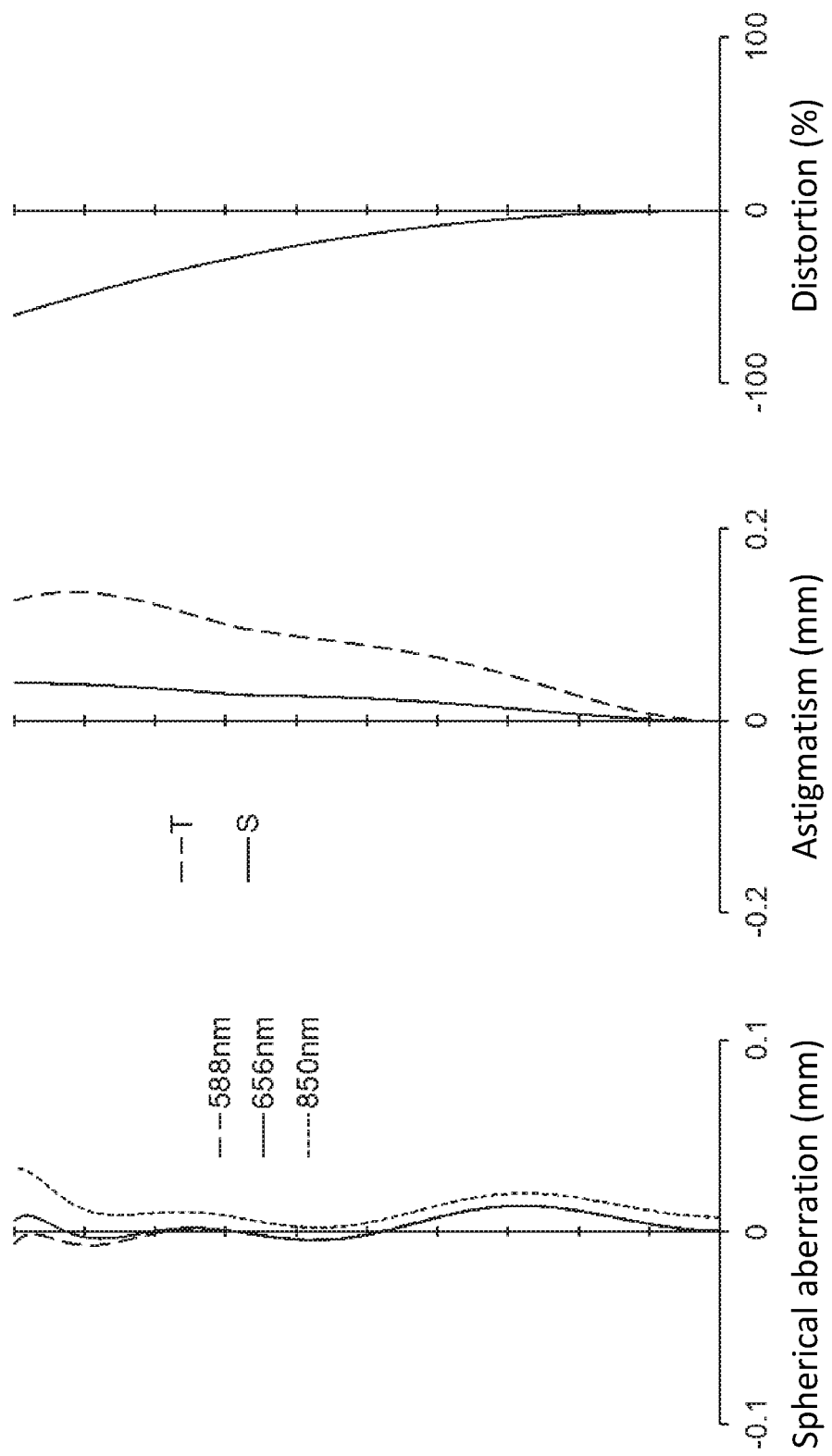
FIG. 18 is an aberration diagram showing a spherical aberration, astigmatism, and a distortion of the imaging lens of FIG. 16.
Figure 19:
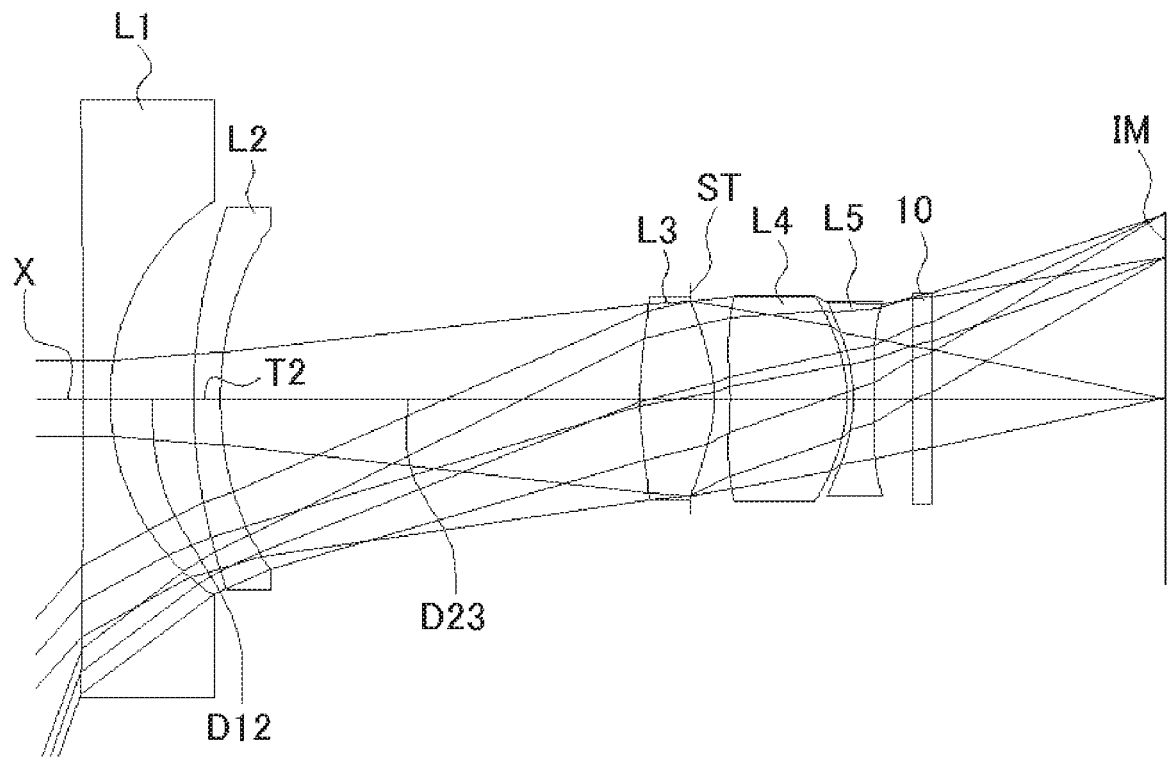
FIG. 19 shows a sectional view of a schematic configuration of an imaging lens in Numerical Data Example 7 of the present invention.

FIG. 17 shows a lateral aberration that corresponds to the half angle of view ω, and FIG. 18 shows the spherical aberration (mm), the astigmatism (mm), and the distortion (%), respectively. As shown in FIGS. 17 and 18, according to the imaging lens of Numerical Data Example 6, the aberrations are also satisfactorily corrected.

NUMERICAL DATA EXAMPLE 7

Basic Lens Data $fir/fd=1.003$ $La/f=5.819$ $f/Dep=2.4$

TABLE 13

| | i | r | d | nd | nir | vd | [mm] |
|---|---|---|---|---|---|---|---|
| | | ∞ | ∞ | | | | |
| L1 | 1* | −266.505 | 0.400 | 1.5348 | 1.5274 | 55.7 | f1 = −6.741 |
| | 2* | 3.656 | 1.228 | | | | |
| L2 | 3* | 7.667 | 0.400 | 1.5348 | 1.5274 | 55.7 | f2 = −30.309 |
| | 4* | 5.110 | 6.200 | | | | |
| L3 | 5* | 5.321 | 1.100 | 1.5348 | 1.5274 | 55.7 | f3 = 2.817 |
| | 6* | −1.950 | −0.355 | | | | |
| ST | 7 | ∞ | 0.587 | | | | |
| L4 | 8* | −4.695 | 1.725 | 1.5348 | 1.5274 | 55.7 | f4 = 6.056 |
| | 9* | −2.162 | 0.100 | | | | |
| L5 | 10* | −2.161 | 0.297 | 1.6503 | 1.6291 | 21.5 | f5 = −3.226 |
| | 11* | 76.027 | 0.577 | | | | |
| | 12 | ∞ | 0.300 | 1.5168 | | 64.2 | |
| | 13 | ∞ | 3.448 | | | | |
| (IM) | | ∞ | | | | | |

T2=0.400 mm
T3=1.100 mm
fd=2.733 mm
fir=2.742 mm
f12=−5.224 mm
La=15.904 mm
Dep=1.142 mm

TABLE 14

Aspherical surface data

| i | k | A4 | A6 | A8 | A10 | A12 | A14 | A16 |
|---|---|---|---|---|---|---|---|---|
| 1 | 0.000E+00 | 0.000E+00 | 0.000E+00 | 0.000E+00 | 0.000E+00 | 0.000E+00 | 0.000E+00 | 0.000E+00 |
| 2 | 1.518E−01 | 0.000E+00 | 0.000E+00 | 0.000E+00 | 0.000E+00 | 0.000E+00 | 0.000E+00 | 0.000E+00 |
| 3 | −2.665E+00 | 0.000E+00 | 0.000E+00 | 0.000E+00 | 0.000E+00 | 0.000E+00 | 0.000E+00 | 0.000E+00 |
| 4 | 1.165E+00 | 0.000E+00 | 0.000E+00 | 0.000E+00 | 0.000E+00 | 0.000E+00 | 0.000E+00 | 0.000E+00 |
| 5 | 0.000E+00 | −1.396E−02 | 1.021E−03 | −6.709E−04 | −1.225E−04 | 0.000E+00 | 0.000E+00 | 0.000E+00 |
| 6 | −6.171E+00 | 2.032E−02 | −1.235E−02 | 1.809E−03 | −1.639E−04 | 0.000E+00 | 0.000E+00 | 0.000E+00 |
| 8 | 0.000E+00 | 1.449E−01 | −7.772E−02 | 3.051E−02 | −6.145E−03 | −6.294E−04 | 5.731E−04 | −8.187E−05 |
| 9 | −9.359E+00 | −2.249E−02 | −1.723E−02 | 8.103E−03 | 4.484E−03 | −4.543E−03 | 1.317E−03 | −1.345E−04 |
| 10 | 0.000E+00 | 8.884E−02 | −7.456E−02 | 3.918E−02 | −3.890E−03 | −3.951E−03 | 1.404E−03 | −1.348E−04 |
| 11 | 0.000E+00 | 2.771E−02 | 9.635E−03 | −1.942E−02 | 1.547E−02 | −5.114E−03 | 4.335E−04 | 5.474E−05 |

The values of the respective conditional expressions are as follows:

$f1/f2=0.222$ $f2/f=−11.090$ $D12/f=0.449$ $D23/f=2.269$ $f2/f3=−10.761$ $f12/f3=−1.855$ $T2/f=0.146$ $T3/f=0.402$ $f4/f=2.216$ $f4/f5=−1.877$

Accordingly, the imaging lens of Numerical Data Example 7 satisfies the above-described conditional expressions (1) through (18).

Figure 20:
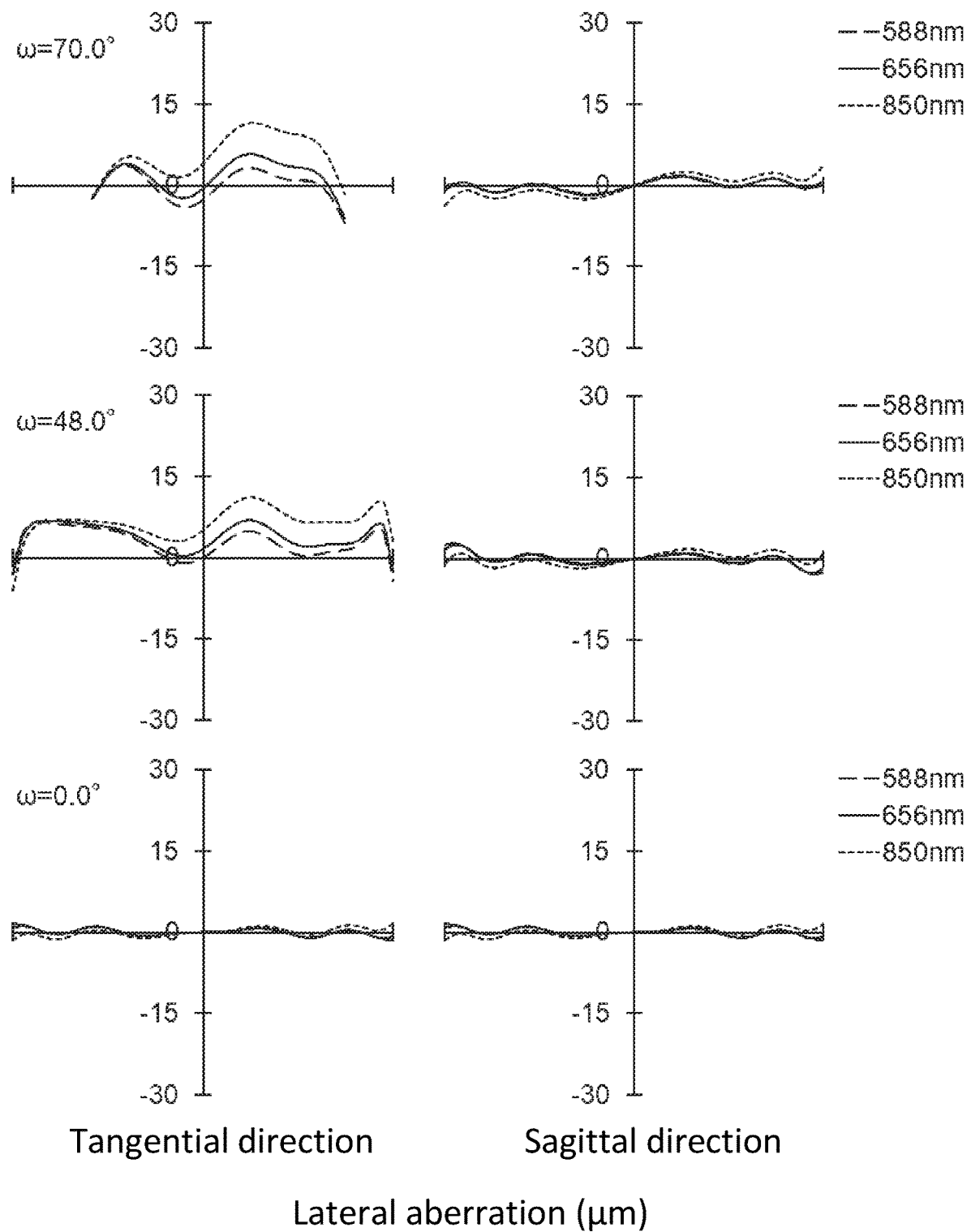
FIG. 20 is an aberration diagram showing a lateral aberration of the imaging lens of FIG. 19.
Figure 21:
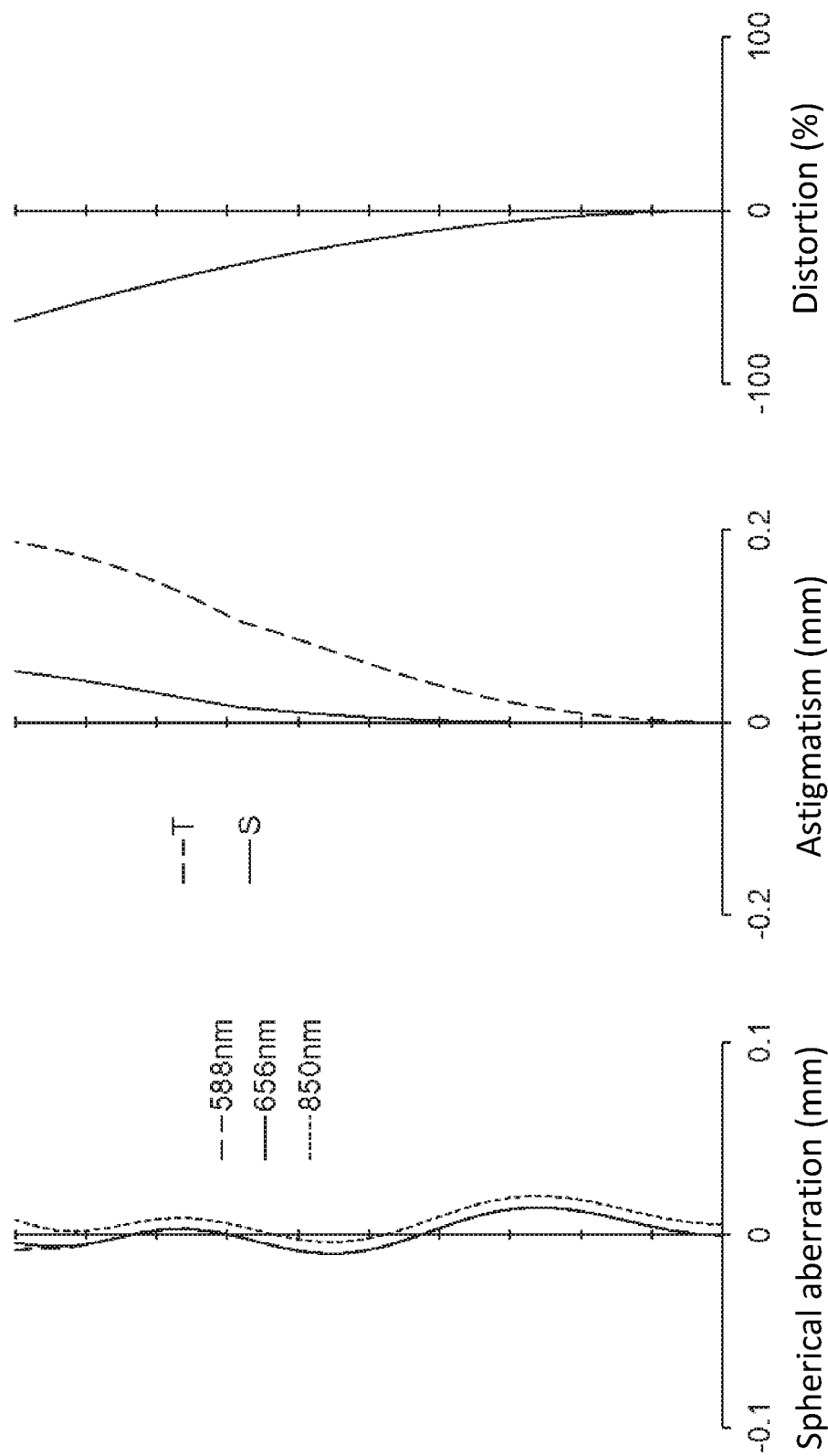
FIG. 21 is an aberration diagram showing a spherical aberration, astigmatism, and a distortion of the imaging lens of FIG. 19.

FIG. 20 shows a lateral aberration that corresponds to the half angle of view ω, and FIG. 21 shows the spherical aberration (mm), the astigmatism (mm), and the distortion (%), respectively. As shown in FIGS. 20 and 21, according to the imaging lens of Numerical Data Example 7, the aberrations are also satisfactorily corrected.

As described above, according to the imaging lens of the embodiment described above, it is achievable to have very wide angle of view (2ω) of 120° or greater. More specifically, according to Numerical Data Examples 1 to 7, the imaging lenses have wide angles of view of 140°. According to the imaging lens of the embodiment, it is possible to take an image over a wider range than that taken by a conventional imaging lens, while having a small size.

According to the imaging lenses of the embodiment, the Fnos are as small as 2.2 to 2.4. According to the imaging lens of the embodiment, it is achievable to obtain a sufficiently bright image without providing the above-described electrical circuit to reduce noises in the imaging element.

Accordingly, when the imaging lens of the embodiment is mounted in an imaging optical system, such as portable devices including cellular phones and smartphones, digital cameras, infrared cameras, digital video cameras, onboard cameras, network cameras, TV conference cameras, fiberscopes, and capsule endoscopes, it is possible to attain both high performance and downsizing of the cameras.

The present invention is applicable to an imaging lens for mounting in relatively small cameras, such as smartphones and cellular phones, digital cameras, infrared cameras, digital video cameras, onboard cameras, network cameras, TV conference cameras, fiber scopes, and capsule endoscopes.

The disclosure of Japanese Patent Application No. 2017-117816, filed on Jun. 15, 2017, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens group; and
a second lens group, arranged in this order from an object side to an image plane side,
wherein said first lens group includes a first lens having negative refractive power, a second lens having negative refractive power, and a third lens,
said second lens group includes a fourth lens and a fifth lens having negative refractive power,
said first lens is formed in a shape so that a curvature radius of a surface thereof on the image plane side is positive,
said fifth lens is formed in a shape so that a surface thereof on the image plane side is aspheric,
said third lens is formed in a shape so that a curvature radius of a surface thereof on the object side is negative,
said fifth lens is formed in the shape so that a curvature radius of a surface thereof on the image plane side is negative, and
said first lens has an Abbe's number $vd1$ and said second lens has an Abbe's number $vd2$ so that the following conditional expressions are satisfied:

$40 < vd1$, $40 < vd2$.

2. The imaging lens according to claim 1, wherein said second lens is formed in a shape so that a curvature radius of a surface thereof on the object side and a curvature radius of a surface thereof on the image plane side are positive.

3. The imaging lens according to claim 1, wherein said second lens has a focal length having an absolute value greater than that of each of the first lens, the third lens, the fourth lens, and the fifth lens.

4. The imaging lens according to claim 1, further comprising an aperture stop disposed between the first lens group and the second lens group.

5. The imaging lens according to claim 1, wherein said first lens has a focal length $f1$ and said second lens has a focal length $f2$ so that the following conditional expression is satisfied:

$0.03 < f1/f2 < 0.3$.

6. The imaging lens according to claim 1, wherein said second lens has a focal length $f2$ so that the following conditional expression is satisfied:

$-45 < f2/f < -5$, where f is a focal length of a whole lens system.

7. The imaging lens according to claim 1, wherein said first lens is arranged to be away from the second lens by a distance $D12$ on an optical axis thereof so that the following conditional expression is satisfied:

$0.1 < D12/f < 0.8$, where f is a focal length of a whole lens system.

8. The imaging lens according to claim 1, wherein said second lens is arranged to be away from the third lens by a distance $D23$ on an optical axis thereof so that the following conditional expression is satisfied:

$0.3 < D23/f < 3.0$, where f is a focal length of a whole lens system.

9. The imaging lens according to claim 1, wherein said third lens has an Abbe's number $vd3$ so that the following conditional expression is satisfied:

$40 < vd3$.

10. The imaging lens according to claim 1, wherein said second lens has a focal length $f2$ and said third lens has a focal length $f3$ so that the following conditional expression is satisfied:

$-15 < f2/f3 < -1.5$.

11. The imaging lens according to claim 1, wherein said second lens has a thickness $T2$ on an optical axis thereof so that the following conditional expression is satisfied:

$0.05 < T2/f < 0.5$, where f is a focal length of a whole lens system.

12. The imaging lens according to claim 1, wherein said third lens has a thickness $T3$ on an optical axis thereof so that the following conditional expression is satisfied:

$0.3 < T3/f < 2.0$, where f is a focal length of a whole lens system.

13. The imaging lens according to claim 1, wherein said fourth lens has an Abbe's number $vd4$ and said fifth lens has an Abbe's number $vd5$ so that the following conditional expressions are satisfied:

$40 < vd4$, $15 < vd5 < 30$.

14. The imaging lens according to claim 1, wherein said fourth lens has a focal length $f4$ so that the following conditional expression is satisfied:

$0.5 < f4/f < 2.5$, where f is a focal length of a whole lens system.

15. The imaging lens according to claim 1, wherein a whole lens system has a focal length $fd$ at a d line and a focal length $fir$ at a wavelength of 850 nm so that the following conditional expression is satisfied:

$0.9 < fir/fd < 1.1$.

16. The imaging lens according to claim 1, wherein said fourth lens has a focal length $f4$ and said fifth lens has a focal length $f5$ so that the following conditional expression is satisfied:

$-2 < f4/f5 < -0.2$.

17. The imaging lens according to claim 1, wherein said third lens has a focal length $f3$ and said fourth lens has a focal length $f4$ so that the following conditional expression is satisfied:

$1.5 < f3/f4 < 20$.

18. The imaging lens according to claim 1, wherein said imaging lens has an angle of view 2ω so that the following conditional expression is satisfied:

$$120° \leq 2\omega.$$

* * * * *